United States Patent [19]

Kikitsu

[11] Patent Number: 5,729,408
[45] Date of Patent: Mar. 17, 1998

[54] MAGNETIC RECORDING/REPRODUCING APPARATUS HAVING A MAGNETIC HEAD WITH A LINEARLY MOVABLE ARM PROVIDED WITH A PLURALITY OF RECORDING/REPRODUCING ELEMENTS

[75] Inventor: Akira Kikitsu, Yokohama, Japan

[73] Assignee: Kabushiki Kaisha Toshiba, Kawasaki, Japan

[21] Appl. No.: 582,392

[22] Filed: Jan. 3, 1996

[30] Foreign Application Priority Data

Jan. 11, 1995 [JP] Japan ................. 7-002521

[51] Int. Cl.⁶ ........................................... G11B 5/48
[52] U.S. Cl. ............................................... 360/104
[58] Field of Search ............................ 360/104, 106

[56] References Cited

U.S. PATENT DOCUMENTS

| | | |
|---|---|---|
| 4,092,732 | 5/1978 | Ouchi . |
| 5,335,126 | 8/1994 | Tokyuama ...................... 360/104 |
| 5,390,059 | 2/1995 | Tokyuama ...................... 360/104 |
| 5,519,554 | 5/1996 | Todd ............................... 360/106 |

FOREIGN PATENT DOCUMENTS

| | | |
|---|---|---|
| 61-120314 | 6/1986 | Japan . |
| 5-342503 | 12/1993 | Japan . |

*Primary Examiner*—A. J. Heinz
*Attorney, Agent, or Firm*—Oblon, Spivak, McClelland, Maier & Neustadt, P.C.

[57] ABSTRACT

A magnetic recording/reproducing apparatus comprises a magnetic recording medium provided with tracks for recording/reproducing information, an arm situated above the magnetic recording medium in a direction crossing the tracks, an arm driver for moving the arm in a longitudinal direction of the arm, and a plurality of recording/reproducing elements for recording/reproducing information on the tracks, the recording/reproducing elements being arranged on the arm along the longitudinal direction of the arm at an interval less than a maximum movement amount of the arm moved by the arm driver. At least one of the recording/reproducing elements records/reproduces parity information on the other elements.

13 Claims, 12 Drawing Sheets

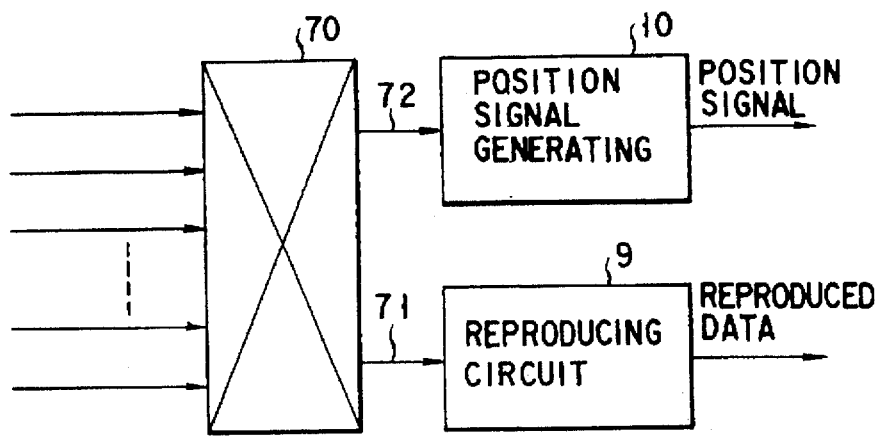
F I G. 11
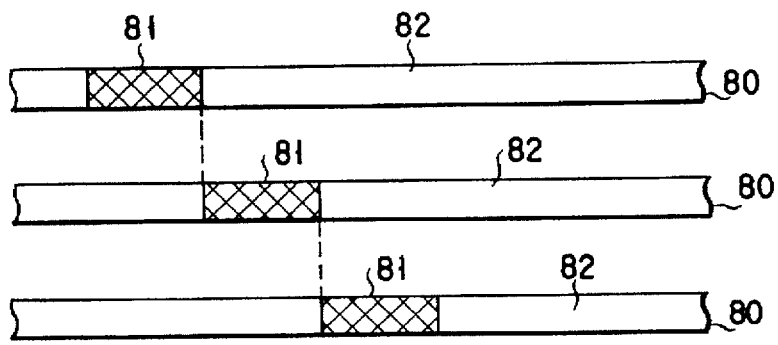
F I G. 12
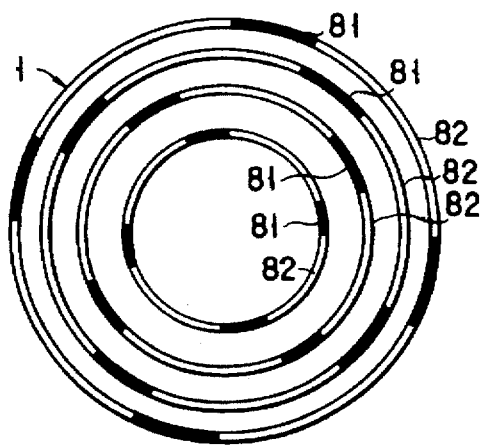
F I G. 13

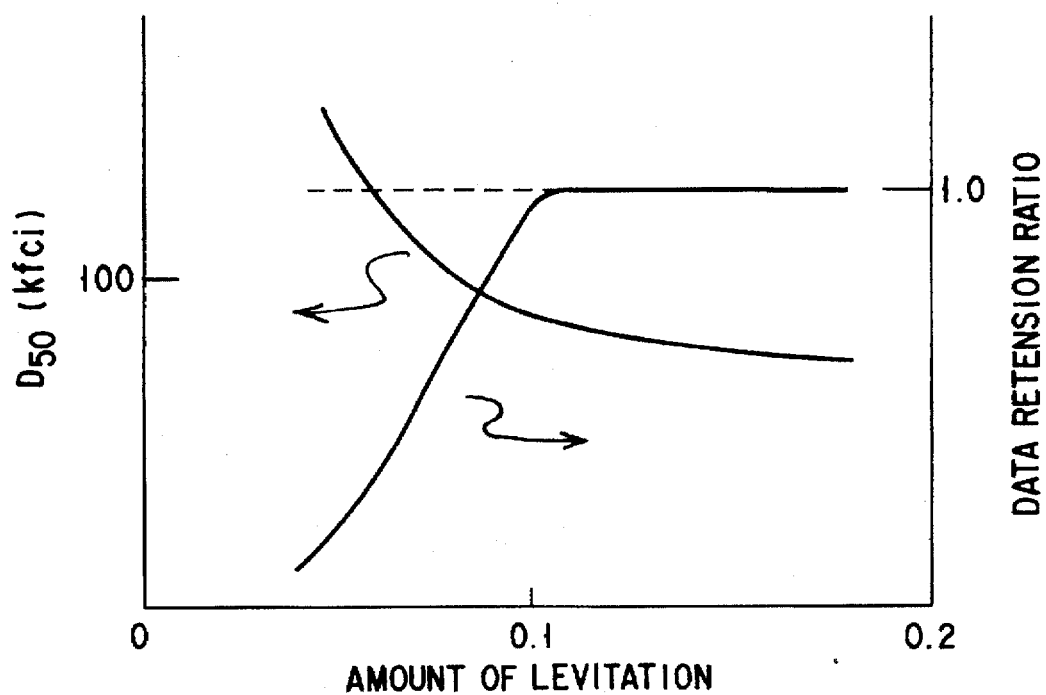
F I G. 21
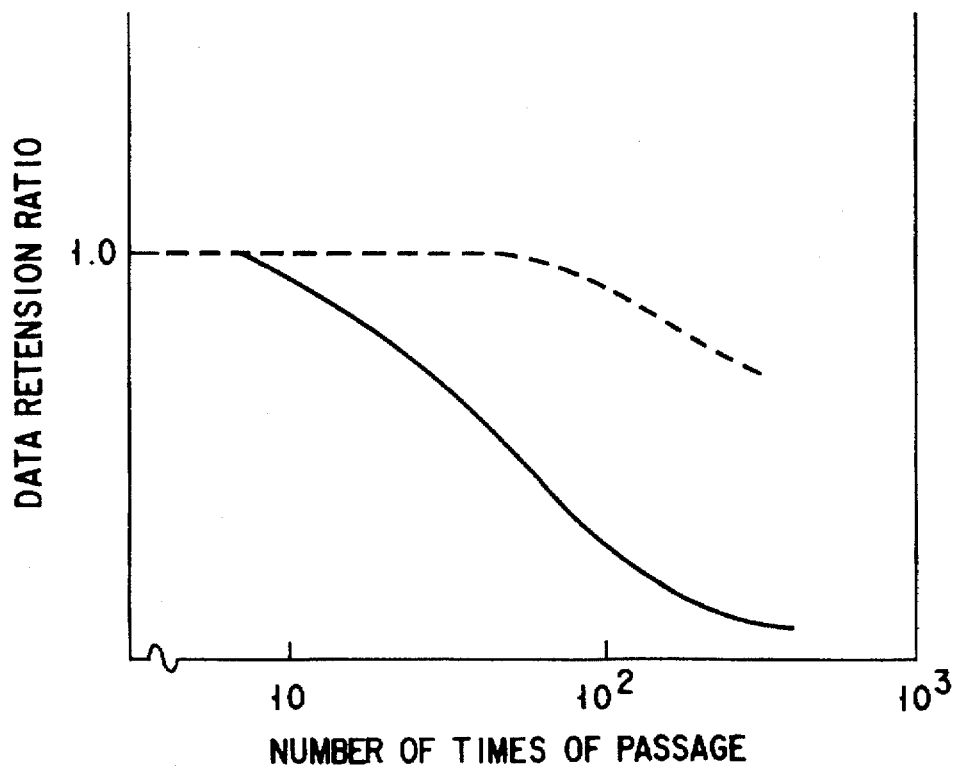
F I G. 22

MAGNETIC RECORDING/REPRODUCING APPARATUS HAVING A MAGNETIC HEAD WITH A LINEARLY MOVABLE ARM PROVIDED WITH A PLURALITY OF RECORDING/REPRODUCING ELEMENTS

BACKGROUND OF THE INVENTION

1. Field of the Invention

The present invention relates to a magnetic recording/reproducing apparatus for recording/reproducing information on a disk-like magnetic recording medium.

2. Description of the Related Art

A higher recording density and a higher transfer rate have been demanded in a magnetic recording apparatus using a disk-shaped magnetic recording medium (hereinafter referred to as "magnetic disk") such as a hard disk, in accordance with a development in performance of information processing devices such as computers. To meet the demand, magnetic recording media and recording/reproducing heads (recording/reproducing elements) have been diligently improved, and the recording capacity per disk has been remarkably increased.

In the conventional magnetic disk apparatus, however, two basic structural features of the head remain substantially unimproved: 1) the recording/reproducing head is attached to a distal end portion of a long arm and is made to access a desired track on the magnetic disk by rotating the arm, and 2) information recording, information reproduction, or both information recording and reproduction is performed by a single head on a surface of the disk. This poses a serious problem in maintaining the precision and speed of track access while increasing the recording density, in particular, the density of recording tracks ("track density"), in the future.

If the track density is increased, the number of recording tracks increases accordingly. Thus, the access speed of the head is inevitably decreased. If the width of each recording track is decreased to increase the track density, the head needs to be positioned with high precision in order to exactly access the desired track. Consequently, the access time further increases. In order to remarkably increase the access speed, it is necessary, though very difficult, to quickly position the distal end of the head attachment arm, which is placed from the center of rotation in the order of centimeters, on the track with the precision in the sub-micron order by mechanical control.

Although an enormous amount of data can be recorded on a single magnetic disk, the recording/reproducing speed is limited due to a mechanical limitation of the rotation of the disk if the data is recorded serially by a single head on a surface of the disk, as in the prior art. Thus, the data transfer rate within the information processing apparatus using the magnetic disk cannot fully be increased.

Besides, in order to achieve high-density magnetic recording, the distance between the magnetic disk and the recording/reproducing head must be reduced. At present, this distance has already been reduced to 0.1 μm or less. If the technical development progresses, the head will operate substantially in "in-contact" state. In such a case, the possibility of damage to the head or magnetic disk (medium) will greatly increase due to the contact therebetween. Once the head is damaged, the magnetic recording/reproducing apparatus with the damaged head will be inoperable and all data will be lost. Even in the case where the magnetic disk alone is damaged, the data will also be lost unless some repairing measure is conducted for the data.

In the prior art, too, there are cases where the magnetic disk is damaged due to collision between the magnetic disk and the head. In such a case, damaged regions on the magnetic disk are only limited points since the head is floating. For example, if a verify bit is included in a data sequence within one segment, all data can be restored on the basis of data preceding and following the damaged point. However, in the case of the "in-contact" operation, a damaged region has a shape of a long scratch extending over the entire circumference of the disk. In this case, unlike the prior art, damaged data cannot be restored on the basis of data on the same track.

As the possibility of unrepairable damage to the head increases, restoration of data becomes difficult even if the magnetic disk alone is damaged. Thus, to ensure reliability is a fundamental problem in higher-density magnetic recording in the future.

In the conventional magnetic disk apparatus, as has been described above, if the recording density and memory capacity of the magnetic disk are further increased, it becomes difficult to perform track access with adequate precision and speed. Furthermore, since the recording/reproducing speed is limited, the data transfer rate within the information processing apparatus using the magnetic disk apparatus cannot fully be increased.

In the prior art, as has been described above, data is serially read/written by the single head by rotating and accessing the arm having the head at the distal end. Thus, it is inherently difficult to achieve the increase in speed operation and storage capacity of the magnetic recording apparatus.

An object of the present invention is to provide a magnetic disk apparatus capable of performing track access with high precision at high speed, and also performing recording/reproducing at high speed.

Another object of the invention is to solve a problem in that the reliability of data and a magnetic disk apparatus is considerably degraded due to contact between a head and a magnetic disk if high-density recording is performed.

SUMMARY OF THE INVENTION

In order to achieve the objects of the invention, a magnetic recording/reproducing apparatus of this invention comprises:

an arm situated above a magnetic recording medium in a direction crossing tracks on the magnetic recording medium; and an arm driver (i.e. arm driving means) for moving the arm in a longitudinal direction of the arm;

wherein a plurality of heads for recording/reproducing information on the magnetic recording medium, the heads being arranged on the arm at an interval less than a maximum movement amount of the arm moved by the arm driver.

The arm driver is coupled to, for example, a proximal end portion of the arm, and comprises a piezoelectric element shiftable in the longitudinal direction of the arm.

The present invention is characterized by further comprising an arm support member, provided outwardly in an in-plane direction of the magnetic recording medium (i.e. the disk-like magnetic recording medium), for supporting the proximal end portion of the arm such that a distance between a distal end portion of the arm and the magnetic recording medium is less than a distance between the proximal end portion of the arm and the magnetic recording medium.

It is desirable that the heads or recording/reproducing elements be elastically supported on the arm. Specifically, the elastic support is achieved by interposing elastic bodies with elastic constants lower than that of the recording/reproducing elements between the recording/reproducing elements and the arm. In this case, the elastic constants of the elastic bodies may be varied among the recording/reproducing elements. Specifically, it is desirable that the elastic constants of the elastic bodies decrease towards the proximal end of the arm. The elastic constant of the arm itself may be varied among the locations on the arm. Specifically, it is desirable that the elastic constant of the arm decrease towards the proximal end of the arm.

It is possible to provide an element selector (i.e. an element selection means) on the arm for selecting one of the recording/reproducing elements.

Furthermore, it is desirable that the magnetic recording medium include a first track on which position signal generation information for generating a position signal representing a relative position of the track on the magnetic recording medium with respect to the recording/reproducing element is recorded, and a second track on which information different from the position signal generation information is recorded.

In the present invention, a plurality of recording/reproducing elements are provided on an arm situated above a magnetic recording medium in a direction crossing tracks on the medium such that the recording/reproducing elements are arranged in a longitudinal direction of the arm at an interval less than a maximum movement amount of the arm. When information recording, information reproduction, or both information recording and reproduction are performed, the recording/reproducing elements come into contact with or approach the magnetic recording medium. Thus, the recording/reproducing elements access the tracks at the same time. In this case, the arm is moved in the radial direction of the disk to enable a desired one of the recording/reproducing elements to access a desired track.

Since the track access is effected by linearly moving the recording/reproducing elements by means of the arm, the following problems in the prior art wherein the track access is effected by rotating the head mounting arm can be solved: tracking errors, degradation of recording/reproducing signals and an increase in noise due to a mechanical error in a head rotating mechanism including the head mounting arm. Furthermore, when the recording/reproducing elements are levitated from the magnetic recording medium, the amount of levitation tends to vary due to a variation in mechanical characteristics. However, such a variation can be limited by performing an in-contact operation. Thus, each recording/reproducing element can perform a stable recording/reproducing operation.

In the conventional magnetic recording/reproducing apparatus, the track access is effected by rotating the arm with the head by means of the motor. Thus, the precision of rotation itself of the motor is lower than, for example, that in the case of using a piezoelectric actuator. In addition, the precision of positioning of the head unit is further degraded by a degree corresponding to the length of a gimbal to which the head unit is attached. By contrast, if the arm is moved in the radial direction of the magnetic recording medium by the piezoelectric element, the track access is effected by linear movement of the arm in the longitudinal direction thereof. Accordingly, the tracking error is associated with the amount of movement of the piezoelectric element alone and is not aggravated by the recording/reproducing head. Furthermore, the piezoelectric element itself can be shifted with a very high precision of the nanometer order, and the positioning error is not amplified. In addition, the tracking precision of the entire head system is remarkably enhanced. Besides, the operation speed of the piezoelectric element can be increased, as compared to the motor, and this contributes to the increase in access speed.

Since the distance between the recording/reproducing elements is less than the maximum movable distance (i.e. maximum shift of the piezoelectric element) of the arm, the track access by each recording/reproducing element can be effected by driving the piezoelectric element alone. Thereby, the precision in movement of the arm and the access speed can be enhanced, as compared to the case of using a plurality of moving mechanisms.

In the reproducing mode, information can be simultaneously read from a plurality of tracks on the magnetic recording medium, and the plurality of tracks can be equivalently accessed at the same time with no time interval. On the other hand, high-density, high-transfer-rate recording can be effected by multi-value recording in which a plurality of tracks are simultaneously accessed also in the recording mode.

Since the proximal end portion of the arm is supported outwardly in the in-plane direction of the magnetic recording medium, the support mechanism is simplified and the stable rotational operation of the disk can be achieved. In addition, the proximal end portion of the arm is supported such that a distance between the distal end portion of the arm and the magnetic recording medium is less than a distance between the proximal end portion of the arm and the magnetic recording medium, the pushing force for pressing each recording/reproducing element on the magnetic recording medium can be made uniform at the time of recording/reproducing.

The pushing force for pressing each recording/reproducing element on the magnetic recording medium can also be made uniform by supporting the recording/reproducing elements on the arm with elastic bodies interposed. Furthermore, the pushing force for pressing each recording/reproducing element on the magnetic recording medium can be made uniform by varying the elastic constant of the arm in the longitudinal direction of the arm.

Element selection means for selecting one of a plurality of recording/reproducing elements is disposed on the arm. Thereby, even when a great number of recording/reproducing elements are disposed on a single arm, the number of wiring lines on the arm is reduced. If the element selection means is constituted by using a semiconductor element or an optical element, high-speed processing can be performed. If switching is effected at a speed higher than the clock of recording signals, parallel recording/reproducing processing can be carried out by performing the element selection operation at the time of the recording/reproducing operation.

Information can be reproduced simultaneously from a plurality of tracks on the magnetic recording medium by a plurality of recording/reproducing elements. If the magnetic recording medium is provided with a first track on which position signal generation information for generating a position signal representing a relative position of the track on the magnetic recording medium with respect to the recording/reproducing element is recorded and a second track on which the position signal generation information is not recorded, data can be reproduced from the second track while the position signal generation information is always read out from the first track. Thus, the position control of the recording/reproducing elements can be performed at high speed and the data recording region on the second track can be enlarged.

The magnetic recording/reproducing apparatus according to the present invention comprises a plurality of recording/reproducing elements for recording/reproducing information on different tracks on at least one magnetic recording medium, and at least one of the recording/reproducing elements records/reproduces parity information on the other elements.

The element (parity element) for recording/reproducing the parity information may be provided on each of the magnetic recording mediums or on a group of magnetic recording mediums. In the former case, the memory capacity decreases but the reliability of data is enhanced. In the latter case, the memory capacity increases but the reliability of data is inferior to the former case. Two or more parity elements may be provided on a single magnetic recording medium. In this case, too, the memory capacity decreases but the reliability of data is enhanced. One of these constructions may be chosen, depending on the required design of the apparatus.

The reliability of the apparatus is not degraded if a missing portion of data can be completely restored. There are various methods of restoring the data. For example, in the case of a data sequence of a two-bit format, information of "1" or "0" (parity information) is added to the end of the data sequence so that the sum of all bits of data is an even value. Thus, even if any one of bits of data is not identified, the missing data can be completely restored by setting the binary data at "1" or "0" so that the sum of all bits is an even value.

In the present invention, the parity element among the recording/reproducing elements (heads) records/reproduces restoration information for restoring data recorded/reproduced by the other elements. Specifically, it is determined by a required system scheme which bit is chosen to form the parity information which is to be recorded/reproduced by the parity element.

For example, the parity element may successively record binary codes (1 or 0) on the magnetic disk from a beginning portion or a reference point of a sector chosen from recording regions associated with the respective elements, so that the sum of bits associated with the respective elements may become an even number.

Alternatively, the parity element may record binary codes (1 or 0) on the magnetic disk in connection with the bits recorded at the same timing from a predetermined reference time point.

The latter is advantageous in that the system for controlling the plural elements can be easily designed. On the other hand, the former is advantageous in that the degree of freedom of design is great. For example, different operational reference clocks can be set for the respective elements, or the recording region can be freely chosen.

The total number of recording bits associated with each element is not necessarily equal. The spatial recording density becomes lower towards the outer periphery of the disk. If a greater total amount of recording bits are provided for the outer peripheral elements, the spatial recording density is made substantially uniform over the entire surface of the disk. Thus, the memory capacity of the disk can be increased. In addition, the higher the recording density of the magnetic recording medium, the higher the possibility of defects. Therefore, it is also possible to increase the memory capacity of the disk in such a manner that when a certain element passes over a defective region, this element does not record data and information of the parity element is determined based on information among the other elements.

If the same number of total recording bits is assigned to each element, the aforementioned advantage of increasing the memory capacity is lost, but the system design is made easier. For example, if all elements simultaneously perform recording/reproducing operations at a predetermined clock timing, the parity information can be simultaneously recorded/reproduced and data restoration is effected at high speed. Since this system is simple, the apparatus construction can also be simplified.

It is not necessary that the same element is always used as parity element. For example, the parity element may be changed successively from the innermost peripheral side to the outermost peripheral side of the disk at predetermined time intervals. In this case, even if the area associated with a certain element is damaged, all data is not lost and the likelihood of restoration increases. Furthermore, if this technique is combined with the data restoration measure to be performed in the data sequence direction, the likelihood of data restoration can easily be increased.

In an example of such a data restoration system, there is known a system called "RAID" including a plurality of failure independent drives. In the RAID system, one of the drives is assigned to a recording operation for data restoration, and the other drives are used as ordinary recording/reproducing drives. Since the system construction of the RAID system is substantially the same as that of an ordinary drive, the system design is easy. However, the size of the entire apparatus increases and the use thereof is limited. In most cases, each drive is operated independently, and a great deal of time is needed when a recording operation is performed by any one of the drives or when address position data of data to be restored is read out. By contrast, in the magnetic recording/reproducing apparatus according to the present invention, a restoration measure is performed among the recording/reproducing elements disposed on the same surface of a recording medium. Since the recording/reproducing elements are provided on the same surface of the same medium, the apparatus of this invention cannot be called "failure independent" and the reliability thereof is lower than that of the RAID system. However, the size of the apparatus can be reduced. In particular, a small-sized apparatus can be provided in high-density recording in which damages to the medium and recording/reproducing elements are serious problems.

In the magnetic recording/reproducing apparatus of this invention, a plurality of recording/reproducing elements are provided on the magnetic recording medium. Thus, the data scan width may be small and the restoration processing can be performed at a much higher speed than in the RAID system.

In addition, the magnetic recording/reproducing apparatus of this invention is characterized in that the distance between the magnetic recording surface of each element and the surface of the magnetic recording medium is 0.1 µm or less.

From the standpoint of requirements for high-density recording, the less the distance between the magnetic recording medium and the recording/reproducing element, the higher the resolution of recording. If data recording is performed at higher density, the distance between the magnetic recording medium and the recording/reproducing element needs to be less than 0.1 µm. In this case, the likelihood of contact between the recording/reproducing element and the magnetic recording medium increases and the likelihood of damage to the recording/reproducing element and the magnetic recording medium in case of contact increases. As the recording density of the magnetic recording apparatus increases, the need to provide the above-described data restoration system increases. In the case of the substantially in-contact operation, a scratch on the magnetic recording medium (disk) tends to extend in the circumferential direction of the disk, unlike the conventional floating type device. In such a case, the conventional data restoration measure based on data sequences has little effect. Thus, the need to provide the data restoration system for restoration in the radial direction of the disk with use of the plural recording/reproducing elements becomes higher in high-density magnetic recording/reproducing apparatuses in which the amount of levitation of recording/reproducing elements is small.

The magnetic recording/reproducing apparatus according to this invention is also characterized in that the recording/reproducing elements are arranged at regular intervals in the radial direction of the recording medium.

If the elements are arranged at regular intervals in the radial direction of the disk, each element is assigned to an equal number of tracks on a conventional recording medium on which the tracks are formed at a predetermined density. Thus, the simultaneous recording/reproduction by the aforementioned parity recording/reproducing element can be achieved by simple apparatus structure. In addition, the load on each element is equalized and the life of the entire apparatus is elongated.

Each of the recording/reproducing elements arranged at regular intervals in the radial direction of the medium may be disposed on the same support member. In this case, by moving the support member in the radial direction of the medium, the respective elements can access simultaneously and the high-speed access is performed. In addition, since there is no need to provide the apparatus with a plurality of units of recording/reproducing elements and gimbals, the apparatus is simplified in structure and reduced in size. Furthermore, if the support member is moved by a piezoelectric element, etc., data access can be performed more quickly than in a conventional method of using a driving motor. If the number of tracks assigned to each element is equal, the positioning of the elements is instantaneously effected by a single operation. Therefore, erroneous selection of tracks by the elements does not occur, and data restoration with high precision at high speed can be performed.

In the conventional RAID apparatus having the same advantage with use of a plurality of magnetic recording mediums, parity information on a parity disk must be rewritten each time any one of data units is rewritten. In this case, all the other data units associated with the memory address of the rewritten data unit must be read out and recalculated. However, if this operation is performed with the recording/reproducing elements disposed on the same support member, the elements are automatically positioned at associated addresses. Thus, If the elements other than the element for updating data and the parity element are set in the read mode, data can be updated instantaneously. Thereby, the high-speed processing can be performed. In addition, the memory region (RAM) is not necessary in the control system, no trouble is caused in the control of the other parts of the computer, and the power consumption is reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 11 is a block diagram showing the structure of a main part of a magnetic disk apparatus according to a sixth embodiment of the invention;

FIG. 12 is a plan view showing recording patterns on adjacent tracks in a magnetic disk apparatus according to a seventh (eighth) embodiment of the invention;

FIG. 13 is a plan view showing recording patterns on a magnetic disk in a magnetic disk apparatus according to an eighth embodiment of the invention;

FIG. 21 shows variations in recording density and data retention ratio in relation to a head levitation amount;

FIG. 22 shows a variation in data retention ratio in relation to the number of times of passage.

DETAILED DESCRIPTION OF THE PREFERRED EMBODIMENTS

Embodiments of the present invention will now be described with reference to the accompanying drawings.
(First Embodiment)

Figure 1:
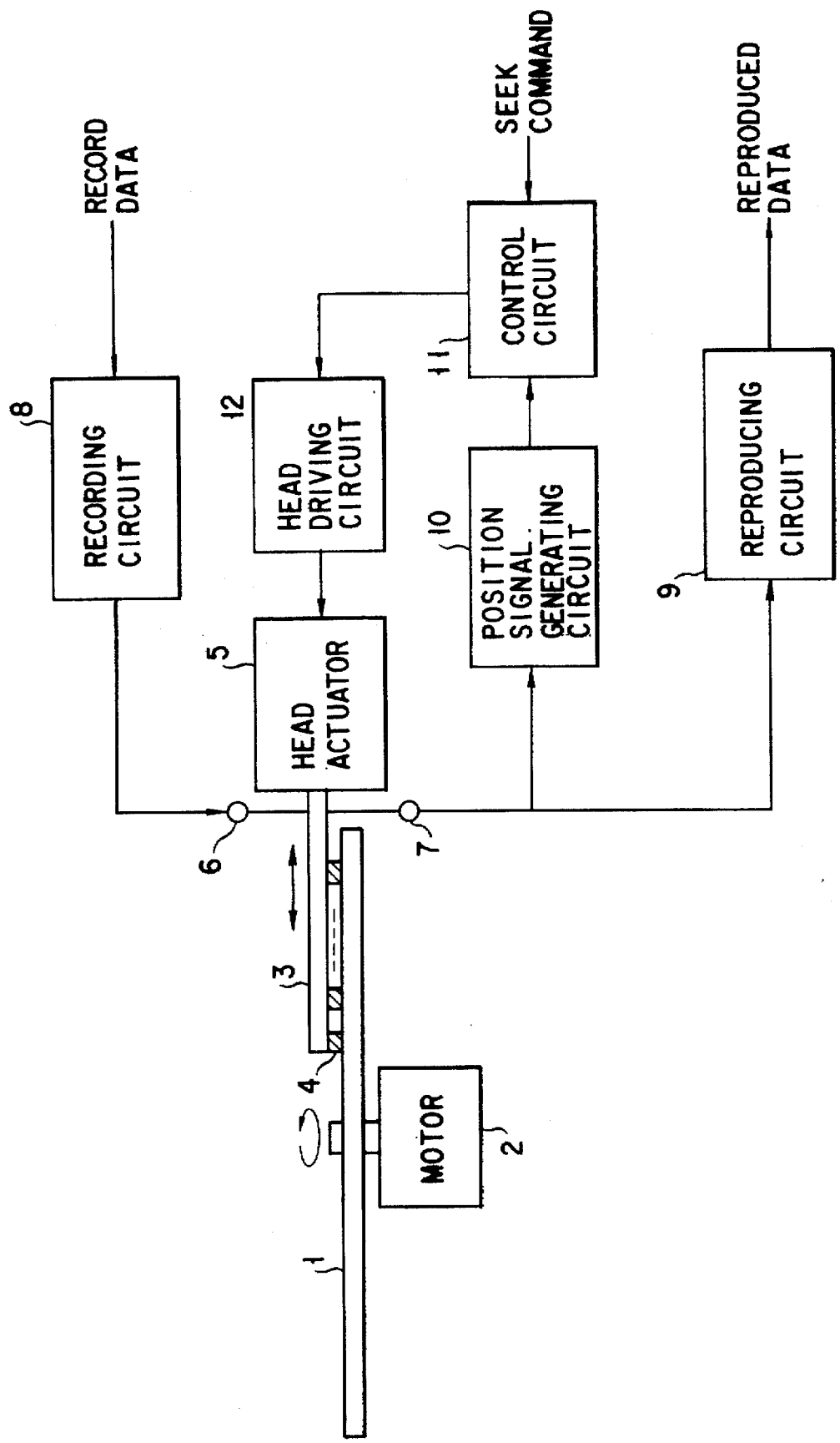
FIG. 1 schematically shows the structure of a magnetic disk apparatus according to a first embodiment of the present invention.

FIG. 1 schematically shows the structure of a magnetic disk apparatus according to a first embodiment of the present invention. In FIG. 1, a magnetic disk (i.e. a disk-like magnetic recording medium) 1 is rotated by a spindle motor 2. An arm 3 with the shape of a flat plate is situated above the magnetic disk 1. The arm 3 extends in a radial direction of the disk 1. A plurality of recording/reproducing heads 4 are disposed on the arm 3 along the longitudinal axis of the arm 3. The arm 3 and recording/reproducing heads 4 constitute a head unit. The arm 3 is designed to hold the recording/reproducing heads 4. The arm 3 is formed of a metallic material, like a gimbal for holding a magnetic head used in a conventional magnetic disk apparatus, or a dielectric material such as Si. The arm 3 and recording/reproducing heads 4 can be formed at the same time and the productivity is enhanced, if the arm 3 is directly cut out of a head substrate of, e.g. Si wafer at the time of forming the recording/reproducing heads 4. The recording/reproducing heads 4 are constructed, for example, as shown in FIGS. 2A and 2B.

Figure 2A:
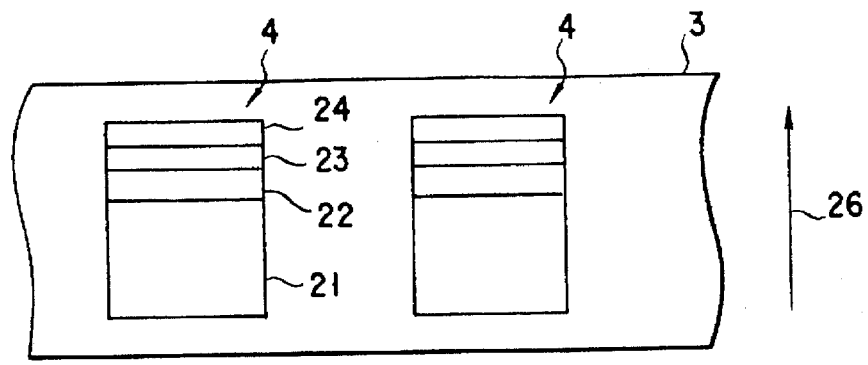
FIGS. 2A and 2B are plan views showing examples of the structure of a recording/reproducing element.

A recording/reproducing magnetic head 4 shown in FIG. 2A comprises a slider 21, a recording element 22, a spacer 23 and a reproducing element 24. These components are successively arranged on the arm 3 in the width direction of the arm 3 (i.e. the rotational direction of the magnetic disk 1), as indicated by an arrow 26. The slider 21 maintains a stable contact condition when the recording/reproducing head 4 comes in contact with the magnetic disk 1. The slider 21 is formed of, for example, a hard dielectric film. The spacer 23 isolates the recording element 22 and reproducing element 24 magnetically or electrically or magnetically and electrically. In addition, the spacer 23 firmly fixes both elements 22 and 24 on the arm 3. The recording element 22 is, for example, a magnetic coil for recording information on the magnetic disk 1 by electromagnetic conversion. The reproducing element 24 is, for example, an MR (magneto-resistance effect) type head for reproducing information by detecting magnetism based on the information on the magnetic disk 1 as a variation in electric resistance.

Figure 2B:
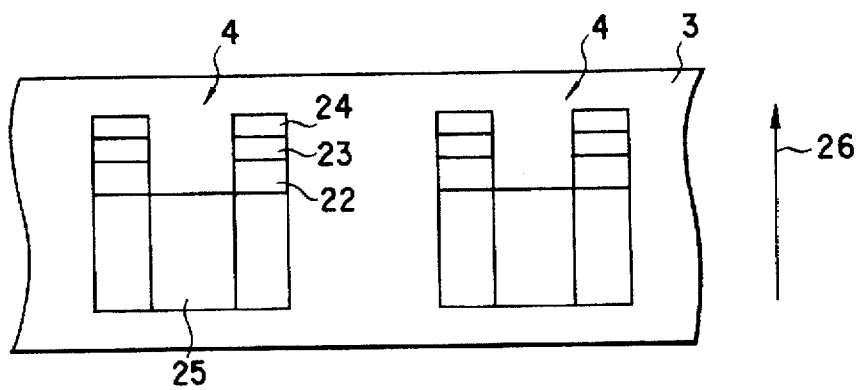

A recording/reproducing magnetic head 4 shown in FIG. 2B comprises a levitating element 25, a recording element 22, a spacer 23 and a reproducing element 24. These components are successively arranged on the arm 3 in the width direction of the arm 3 (i.e. the rotational direction of the magnetic disk 1), as indicated by an arrow 26. The levitating element 25 is similar to a slider used in a conventional levitation type magnetic head. The levitating element 25 has a pair of rails for obtaining a desired force of levitation from the magnetic disk 1. The rails are situated on both sides of the levitating element 25 in the longitudinal direction of the arm 3. The recording element 22, spacer 23 and reproducing element 24, similar to those shown in FIG. 2A, are provided along lines extending from the rails.

In the present embodiment, the arm 3 is situated in the radial direction of the magnetic disk 1. However, it is not necessary to situate the arm 3 exactly in parallel to the radial direction of the disk 1. The arm 3 may be situated in a direction defined between the radial direction and circumferential direction of the magnetic disk 1. In brief, the arm 3 may be situated in any direction crossing the tracks on the magnetic disk 1. It is desirable from the standpoint of track access, however, that the arm 3 be arranged in the radial direction of the magnetic disk 1.

Referring back to FIG. 1, a proximal end portion of the arm 3 is coupled to a head actuator 5 serving also as arm supporter. The arm 3 has a free distal end portion. The arm supporter of the head actuator 5 is provided outward in the in-plane direction of the magnetic disk 1, and the arm supporter moves the arm 3 in the radial direction of the magnetic disk 1. The pitch P (see FIG. 3) of the recording/reproducing heads 4 on the arm 3 is less than the maximum distance of the movement of the arm 3 by the head actuator 5.

The arm 3 is provided with a plurality of recording terminals 6 and a plurality of reproducing terminals 7 connected respectively to the recording elements 22 and reproducing elements 24 of the recording/reproducing heads 4 shown in FIG. 2A or 2B. The recording terminals 6 are connected to a recording circuit 8, and the reproducing terminals 7 are connected to a reproducing circuit 9 and a position signal generating circuit 10. The recording circuit 8 processes input record data and supplies the processed record data to the recording elements 22. The reproducing circuit 9 processes signals reproduced by the reproducing elements 24 and outputs reproduced data.

The position signal generating circuit 10 processes position signal generation information recorded on the magnetic disk 1, thereby generating position signals representing the relative positions of the recording/reproducing heads 4 to the tracks on the magnetic disk 1. The position signal generation information is so-called servo information of a specific pattern written on the tracks on the magnetic disk 1 in advance. Hereinafter, the position signal generation information is referred to as servo information. The pattern of the servo information may be similar to that used in the conventional magnetic disk apparatus. Since the pattern of the servo information is well known, a description thereof is omitted. The position signal generated by the position signal generating circuit 10 is input to a control circuit 11. The control circuit 11 supplies a control signal to a head driving circuit 12 for actuating the head actuator 5.

Figure 3:
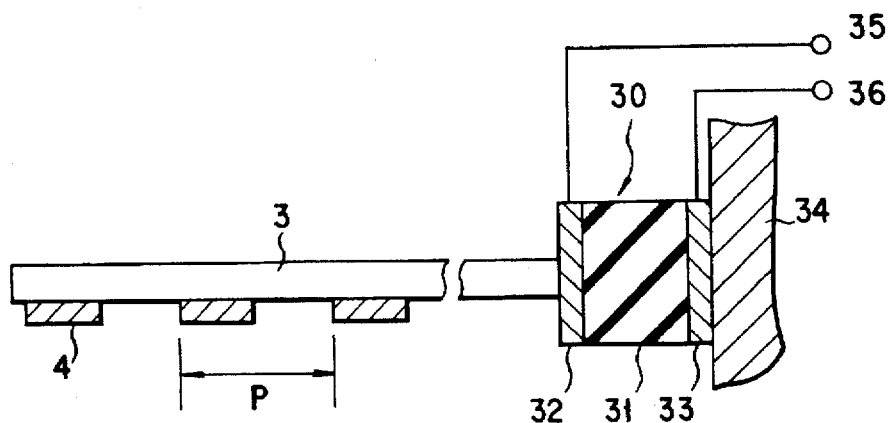
FIG. 3 is a cross-sectional view showing the structure of a main part in FIG. 1.

FIG. 3 shows an example of the head actuator 5. The head actuator 5 comprises a piezoelectric element 30 in which electrode films 32 and 33 are attached to both surfaces of a piezoelectric plate 31 in the thickness direction of the plate 31. The electrode film 32 on the free-end side of the actuator 5 is coupled to the proximal end portion of the arm 3, and the electrode film 33 on the fixed-end side of the actuator 5 is coupled to a base 34 fixed on the magnetic disk apparatus. Terminals 35 and 36 are led out of the electrode films 32 and 33, and the led-out terminals 35 and 36 are connected to the head driving circuit 12 shown in FIG. 1.

When a voltage is applied across the electrode films 32 and 33 of the piezoelectric element 30 by the head driving circuit 12, the piezoelectric plate 31 shifts in the thickness direction thereof. The arm 3 having the proximal end portion coupled to the piezoelectric element 30 is moved in the longitudinal direction of the arm 3 by the shift of the piezoelectric plate 31. In this case, the maximum distance of movement of the arm 3 is determined by the maximum degree of shift of the piezoelectric element 30 due to the shift of the piezoelectric plate 31. If the arm 3 is moved in the longitudinal direction thereof, i.e. in the radial direction of the magnetic disk 1, the recording/reproducing heads 4 disposed on the arm 3 are also moved in the radial direction of the magnetic disk 1.

The relative positions of the recording/reproducing heads 4 to the tracks on the magnetic disk 1 vary in accordance with the movement of the recording/reproducing heads 4. Accordingly, the position signal generating circuit 10 generates position signals representing the relative positions on the basis of the aforementioned servo information and delivers the position signals to the control circuit 11. For example, a seek command to seek a desired track to be accessed on the magnetic disk 1 is input to the control circuit 11 from a host computer (not shown). On the basis of the track position indicated by the seek command and the position signal from the position signal generating circuit 10, the control circuit 11 delivers the control signal to the head driving circuit 12. Thereby, a desired one of the recording/reproducing heads 4 can be positioned on the desired track. In other words, the desired track can be accessed.

In FIG. 3, the piezoelectric element 30 constituting the head actuator 5 comprises a single layer. However, the piezoelectric element 30 may replaced with a lamination type piezoelectric actuator in which a plurality of piezoelectric elements of the same construction are laminated. If the lamination type piezoelectric actuator is used, the necessary amount of shift of the actuator, which is needed to move the arm 3, can be easily attained. In FIG. 3, the piezoelectric element 30 is directly coupled to the proximal end portion of the arm 3. If the construction of the apparatus makes it difficult to directly couple the piezoelectric element 30 to the arm 3, it is possible to couple the piezoelectric element 30 to the arm with a suitable transmission mechanism interposed.

According to the present embodiment, the following advantages can be obtained.

In the present embodiment, a plurality of recording/reproducing heads 4 are disposed on the arm 3 in the radial direction of the magnetic disk 1. By moving the arm 3 in the radial direction of the magnetic disk 1, the recording/reproducing heads 4 can be made to access desired tracks. Accordingly, this embodiment can overcome the problems of tracking errors, degradation of recording/reproducing signals and an increase in noise, which occur, in the prior art, due to a mechanical error in a head rotating mechanism including a head mounting arm. In this prior art, the head mounting arm having a head disposed on a distal end portion thereof is rotated to effect track access.

When the recording/reproducing head 4 is levitated from the magnetic disk 1, the amount of levitation tends to vary due to a variation in mechanical characteristics. The variation in amount of levitation, however, can be reduced by performing the in-contact operation, as in the present embodiment. Thus, each recording/reproducing head 4 can perform stable recording/reproducing operations.

In the conventional magnetic disk apparatus, the track access is effected by rotating the arm with the head by means of the motor. Thus, the precision of rotation itself of the motor is lower than, for example, that in the case of using the head actuator 5 using the piezoelectric element 30. In addition, the precision of positioning of the head unit of the disk apparatus is further degraded by a degree corresponding to the length of the gimbal to which the head unit is attached.

By contrast, if the arm 3 is moved in the radial direction of the magnetic disk 1 by the piezoelectric element 30, as in the present embodiment, the track access is effected by linear movement of the arm in the longitudinal direction thereof. Accordingly, the positioning error of the recording/reproducing head 4 relative to the track, i.e. tracking error, is associated with the amount of movement of the piezoelectric element 30 alone and is not aggravated by the recording/reproducing head 4. Furthermore, the piezoelectric element 30 itself can be shifted with a very high precision of the nanometer order, and the positioning error is not amplified. In addition, the tracking precision of the entire head system is remarkably enhanced. Besides, the operation speed of the piezoelectric element 30 can be increased, as compared to the motor, and this contributes to the increase in access speed.

The distance between the recording/reproducing heads 4 is less than the maximum distance of movement of the arm 3 (the maximum distance of shift of piezoelectric element 30). Thus, all the recording/reproducing heads 4 can be driven by the common piezoelectric element 30. Thereby, the precision of movement and the track access speed of the arm 3 are increased, as compared to the case where a plurality of moving mechanisms are used for the respective recording/reproducing heads 4.

Specifically, in the structure of the present embodiment, the pitch P of arrangement of the recording/reproducing heads 4 was set at 30 μm, and the maximum shift amount of the piezoelectric element 30 was set at 45 μm. The recording/reproducing head 4 could be moved to a desired position in the radial direction of the magnetic disk 1 within the range of 30 μm. On the other hand, the width of the track region in the radial direction, which is designated to the associated one of the recording/reproducing heads 4, was set at 30 μm, the width of the inter-track region (guard band) on the magnetic disk 1 was set at 0.3 μm, and the track width was set at 1.2 μm. Twenty tracks were assigned to each of the recording/reproducing heads 4. The access time (seek time) of the recording/reproducing head 4 to a desired track was 10 μsec. It was confirmed that the track access can be effected at very high speed and precision, as compared to the case where the track access is effected by the rotational movement of the head mounting arm.

In the present embodiment, when both recording and reproducing operations, or one of them, is performed, a plurality of recording/reproducing heads 4 come into contact with the magnetic disk 1. Thereby, it is possible to record information on two or more tracks at a time, or reproduce information from two or more tracks at a time.

Accordingly, the reproducing operation is equivalent to the operation in which a plurality of tracks are accessed with no time interval, and the reproduction speed is remarkably increased. For example, if the number of tracks, from which information is to be reproduced, is two, the reproduction speed is doubled. If the number of the tracks is three, the reproduction speed is tripled. In this manner, the same amount of information can be reproduced at higher speed. In the conventional system, two-value recording is performed in the recording mode. By contrast, in the present embodiment, even if information to be recorded on a plurality of tracks at the same time is of the two-value format, four-value recording is effected if information is recorded on two tracks at the same time, eight-value recording is effected if information is recorded on three tracks at the same time, and 16-value recording is effected if information is recorded on four tracks at the same time. Therefore, as compared to the case where two-value recording is effected on each track, the recording density and transfer rate can be increased.

(Second Embodiment)

Figure 4A:
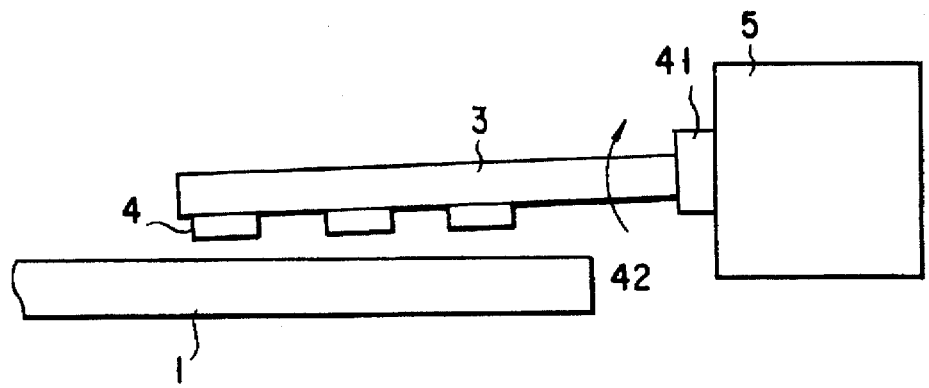
FIGS. 4A and 4B are side views showing the structure of a main part of a magnetic disk apparatus according to a second embodiment of the invention.
Figure 4B:
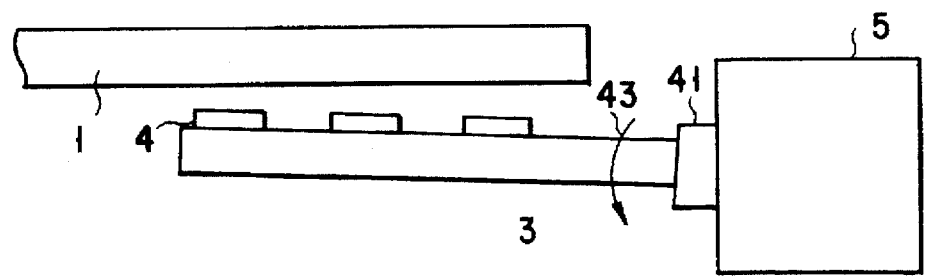

FIGS. 4A and 4B show the structures of main parts of a second embodiment of the invention. An arm support member 41 for supporting a proximal end portion of the arm 3 of the head actuator 5 is formed of an elastic material such as rubber. The proximal end portion of the arm 3 and the arm support member 41 are situated outside the magnetic disk 1 in the in-plane direction thereof. The arm support member 41 supports the proximal end portion of the arm 3 such that the distance between a distal end portion of the arm 3 and the magnetic disk 1 is less than the distance between the proximal end portion of the arm 3 and the magnetic disk 1.

In this case, the recording/reproducing head 4 on the proximal side of the arm 3 is placed on the magnetic disk 1 in a predetermined contact state, after the recording/reproducing head 4 on the distal side of the arm 3 is placed on the disk 1. In principle, there is no limitation to the difference between the distance from the proximal side of the arm 3 to the magnetic disk 1 and the distance from the distal side of the arm 3 to the disk 1. When the piezoelectric element 30, as shown in FIG. 3, is used as head actuator 5, the head support member 41 may be attached to the electrode film 32 on the arm (3) side by means of, e.g. an adhesive.

In FIG. 4A, the arm 3 is situated above the magnetic disk 1, and the recording/reproducing heads 4 are put in contact with the magnetic disk 1. In this case, the arm support member 41 produces a proper torque (stress) for rotating the arm 3 in a direction away from the magnetic disk 1, as indicated by an arrow 42. Thereby, a proper force is applied to push each recording/reproducing head 4 upon the magnetic disk 1.

In FIG. 4B, the arm 3 is situated below the magnetic disk 1, in reverse to the case shown in FIG. 4A, and the recording/reproducing heads 4 are put in contact with the magnetic disk 1. In this case, too, the arm support member 41 produces a proper torque for rotating the arm 3 in a direction away from the magnetic disk 1, as indicated by an arrow 43. Thereby, a proper force is applied to push each recording/reproducing head 4 upon the magnetic disk 1. According to the present embodiment, the proximal end portion of the arm 3 is supported outside the magnetic disk 1 in the in-plane direction of the disk 1. Thus, the structure of the head support member 41 is simplified, and the magnetic disk 1 can be stably rotated. Besides, the proximal end portion of the arm 3 is supported such that the distance between the distal end portion of the arm 3 and the magnetic disk 1 is less than the distance between the proximal end portion of the arm 3 and the magnetic disk 1. By making use of the stress of the arm 3 produced when the recording/reproducing heads 4 come into contact with the magnetic disk 1, the force for pushing the recording/reproducing heads 4 upon the magnetic disk 1 can be made uniform, and the recording/reproducing characteristics of the respective recording/reproducing heads 4 are equalized.

The advantages of the present embodiment will now be described in greater detail. Suppose that the recording/reproducing heads 4 are pushed on the magnetic disk 1 with the proximal end portion of the arm 3 used as fixed end, irrespective of whether or not the recording/reproducing heads 4 are in contact with the magnetic disk 1 or levitating from the disk 1. Since the force for pushing the recording/reproducing heads 4 upon the magnetic disk 1 is produced from the proximal end portion of the arm 3 alone, the pushing force is strong at the proximal end portion of the arm 3 and decreases towards the distal end portion of the arm 3. If the arm 3 is pushed on the magnetic disk 1 while the arm 3 is kept in parallel to the disk 1, the pushing force acting on the respective recording/reproducing heads 4 becomes non-uniform and uniform recording/reproduction cannot be achieved. Moreover, in the case where the recording/reproducing heads 4 are levitated from the magnetic disk 1, a warp of the arm 3 or a variation in amount of levitation of the arm 3 may be caused by accidental contact between the recording/reproducing heads 4 and magnetic disk 1.

In the present embodiment, however, the above problem does not occur since the arm 3 is pushed on the magnetic disk 1 in the state in which the proximal portion of the arm 3 is remoter from the disk 1 than the distal portion of the arm 3. Specifically, the force for pushing the recording/reproducing heads 4 onto the magnetic disk 1 is produced by slight rotation of the proximal portion of the arm 3. Thus, the pushing force on the distal end portion of the arm 3, which is first put in contact with the magnetic disk 1, is relatively increased and the force to push the respective recording/reproducing heads 4 onto the magnetic disk 1 is made uniform and the warp or variation in amount of levitation of the arm 3 can be reduced.

(Third Embodiment)

Figure 5:
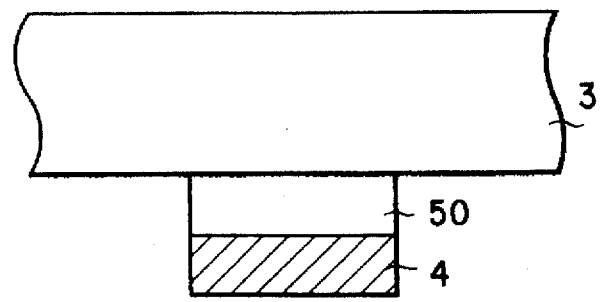
FIG. 5 is a side view showing the structure of a main part of a magnetic disk apparatus according to a third embodiment of the invention.

FIG. 5 shows a third embodiment wherein an elastic body 50 is interposed between the arm 3 and the recording/reproducing head 4, thereby uniforming the force for pushing the recording/reproducing head 4 onto the magnetic disk 1.

The elastic body 50 is formed of a thin film of a material containing an element with an elastic modulus lower than that of an element of which the main part of the recording/reproducing head 4 is formed. Now consider a thin film head structure wherein, for example, the recording element 22 and reproducing element 24 of the recording/reproducing head 4, shown in FIGS. 2A and 2B, are constructed such that a plurality of conductive layers are laminated, with interlayer insulating layers of, e.g. silicon oxide films interposed, on an insulating plate (head substrate) of, e.g. alumina. In this case, the elastic body 50 is formed of a metal such as Au, Ti, W, Cu, Al, Cr, Ni, Nb, Mo, Ta, Pt or Pd, or a dielectric material such as Si, Si-O, Si-N, Al-O, Al-N, Ti-O, Ti-N or B-N, or a mixture thereof. The elastic body 50 may also be formed of a complex thin film having an effect of locally absorbing a stress induced in the entire film, for example, a thin film in which metal particles are dispersed in a matrix, a film in which different elements are phase-separated, a porous film, or a thin film obtained by finely processing a dielectric material of Si, etc. by a semiconductor process of etching, etc.

The advantage obtained by the elastic body 50 will now be described. The force for pushing the recording/reproducing head 4 onto the magnetic disk 1 is produced in accordance with the distance (z) of movement of the proximal end portion of the arm 3 towards the magnetic disk 1. Since the weight of the arm 3 itself is much greater than that of the recording/reproducing head 4, it is difficult to precisely control the pushing force for each recording/reproducing head 4 only with the movement distance (z) of the arm 3. In addition, it is assumed that temporal and local variations in distance between the magnetic disk 1 and recording/reproducing head 4 will occur due to a warp or surface projections of the magnetic disk 1. It is difficult to maintain a constant pushing force for each recording/reproducing head 4, while compensating such variations.

By contrast, in the present embodiment, the elastic body 50 with an elastic modulus lower than that of the main constituent material of the recording/reproducing head 4 is provided between the arm 3 and the recording/reproducing head 4. Thereby, the above problem is solved. Specifically, if the pushing force is expressed by k.z, wherein z is the movement distance of the recording/reproducing head 4 driven by the force transmitted from the arm 3, and k is the elastic constant acting between the arm 3 and the recording/reproducing head 4. Accordingly, by setting the elastic constant k at a low value, a large variation of z, which results in a large variation in force, can be converted to a slight variation in pushing force. The elastic constant acting between the arm 3 and recording/reproducing head 4 can be changed by providing the elastic body 50 having a proper elastic constant between the arm 3 and the recording/reproducing head 4, as in the present embodiment. In this case, in order to convert the variation in movement distance z to a variation in such a pushing force as to cause no damage to the recording/reproducing head 4, it is desirable that the elastic constant of the elastic body 50 be less than that of the recording/reproducing head 4, as in the present embodiment.

Figure 6A:
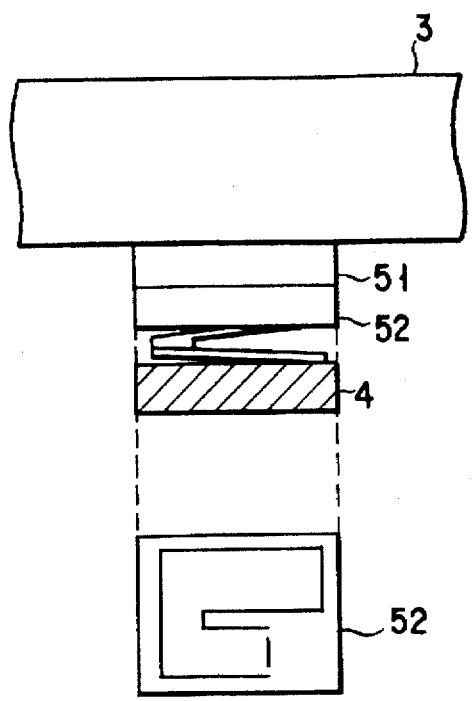
FIGS. 6A to 6D are side views and plan views showing examples of the specific structure of an elastic member in FIG. 5.
Figure 6B:
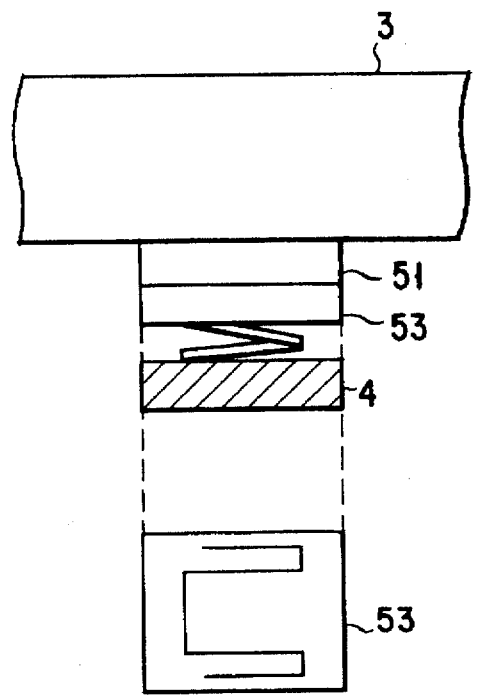

FIGS. 6A to 6D show various examples of the elastic body 50. In FIG. 6A, an underlayer 51 is provided on the arm 3, and an elastic thin film layer 52 formed of a dielectric material such as Si, which is finely processed in a spiral spring shape by a semiconductor process, is provided on the underlayer 51. In FIG. 6B, an underlayer 51 is similarly provided on the arm 3, and an elastic thin film layer 53 formed of a dielectric material such as Si, which is finely processed in a folded spring shape by a semiconductor process, is provided on the underlayer 51. These fine spring shapes are determined by manufacturing processes, and are not limited to these examples if a desired elastic constant is obtained.

Figure 6C:
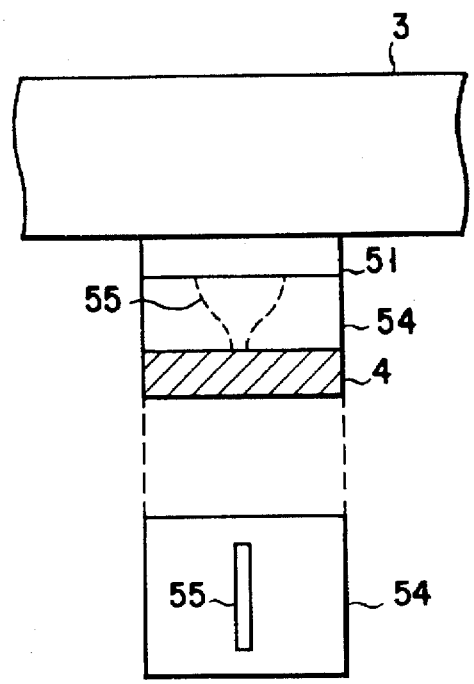

In FIG. 6C, an underlayer 51 is similarly provided on the arm 3, and a hollow elastic thin film layer 54 having a cavity 55 is provided on the underlayer 51. Thereby, the elastic modulus of the entire thin film constituting the elastic thin film layer 54 is reduced. The elastic thin film layer 54 can be formed, for example, in the following manner. A material layer, which is to be processed into the elastic thin film layer 54, is corroded by isotropic etching, deeper than a pattern formed on the surface of the material layer, thereby forming the cavity 55. This finely processed shape is determined by a manufacturing process, and is not limited to this example if a desired elastic constant is obtained. The degree of isotropy of etching can be properly chosen.

Figure 6D:
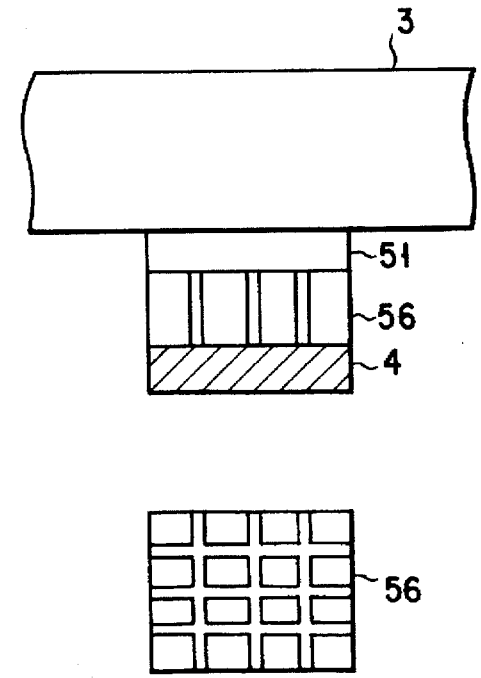

In FIG. 6D, an underlayer 51 is provided on the arm 3, and an elastic thin film layer 56 with a finely divided structure is provided on the underlayer 51. The stress acting in such a direction as to compress the thin film is reduced by deformation in the in-plane direction of the divided portions of the film layer 56. Thus, the elastic constant of the entire thin film is decreased. In this case, the elastic constant can be controlled by the processing pattern on the material layer to be formed into the elastic thin film layer 56. It is therefore possible to easily obtain a desired elastic constant. Of course, the shape of the thin film layer 56 with the divided structure is not limited, if a desired elastic constant can be obtained.

As has been described above, the elastic modulus of the elastic body 50 can be controlled by the film thickness or composition in the case of metallic or dielectric thin films, or the material or concentration of the substance to be mixed in the case of complex thin films, or the processing shape in the case of finely processed thin films. In this manner, elastic bodies 50 having different elastic constants for the respective recording/reproducing heads 4 are formed by relatively easily processes. Thus, the respective recording/reproducing heads 4 can be pressed on the magnetic disk 1 with uniform pushing force.

The arm 3 has positional non-uniformity in elastic constant due to the heterogeneity thereof. If the positional non-uniformity in elastic constant causes non-uniformity in pushing force for pressing the respective recording/reproducing heads 4 on the magnetic disk 1, it is necessary to compensate the positional non-uniformity in elastic constant. In this embodiment, the elastic constants of the elastic bodies 50 of the respective recording/reproducing heads 4 are made differ from each other, thereby compensating the distribution of elastic constants in the longitudinal direction of the arm 3. Thus, the respective recording/reproducing heads 4 can be pressed on the magnetic disk 1 with more uniform pushing force.

Figure 7A:
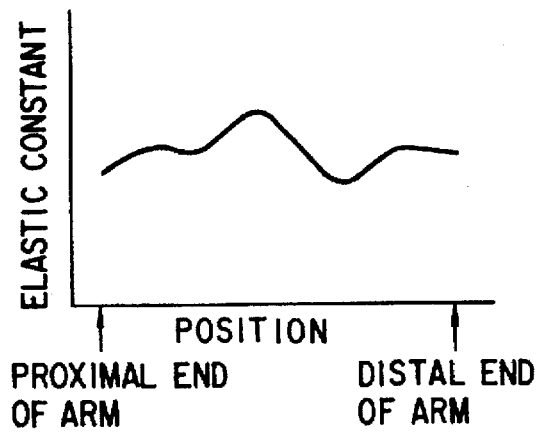
FIGS. 7A to 7C are graphs showing relationships between the position on the arm and the elastic constant of the elastic member in the third embodiment of the invention.

As has been described in connection with the third embodiment, since the arm 3 is fixed at the proximal end portion thereof, the pushing force for pressing the recording/reproducing heads 4 on the magnetic disk 1 differs between the proximal end side and distal end side of the arm 3. Such non-uniformity in pushing force can be compensated by the elastic bodies 50. In this case, the elastic constants of the elastic bodies 50 are gradually decreased towards the proximal end of the arm 3. Specifically, in a first example in which the elastic constants of the elastic bodies 50 of the recording/reproducing heads 4 are made to differ from each other, the elastic bodies 50 are formed of thin films of at least one selected from among the group consisting of Ti, W, Nb, Pt and Au, and the elastic constants of the elastic bodies 50 are controlled by differently patterning the thin films for the respective recording/reproducing heads 4. On the other hand, local variations in elastic modulus of the arm 3 are measured in advance. The elastic constants of the elastic bodies 50 under the recording/reproducing heads 4 are set so as to compensate the local variations. FIG. 7A shows a distribution of elastic constants of the elastic bodies 50 in the longitudinal direction of the arm 3. Even if any of the aforementioned materials is used to form the elastic bodies 50, the pushing force for pressing the recording/reproducing heads 4 on the magnetic disk 1 can be made uniform.

Figure 7B:
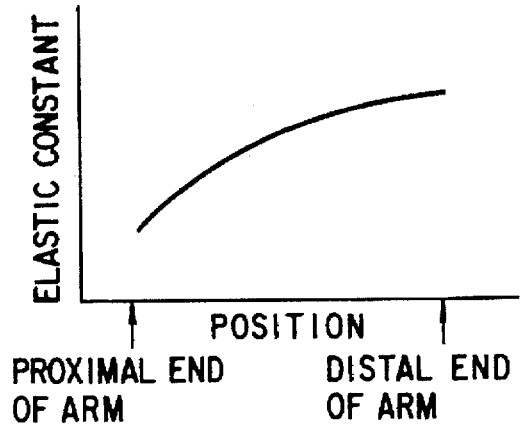

In a second example in which the elastic constants 10 of the elastic bodies 50 of the recording/reproducing heads 4 are made to differ from each other, the elastic bodies 50 are formed of thin films of at least one selected from among the group consisting of Ti, W, Nb, Pt and Au and the thickness of the thin films are gradually varied for the respective recording/reproducing heads 4. Thus, a substantially continuous distribution of elastic constants is obtained in the longitudinal direction of the arm 3, as shown in FIG. 7B. Thus, even if the pushing force for pressing the respective recording/reproducing heads 4 on the magnetic disk 1 varies due to the fact that the arm 3 is fixed at the proximal end portion thereof, the variation can be corrected.

Figure 7C:
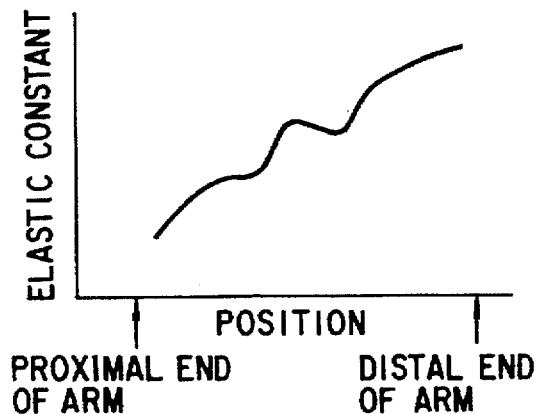

In a third example, the first and second examples are combined and thus an elastic constant distribution, as shown in FIG. 7C, or a synthesis of characteristics shown in FIGS. 7A and 7B, can be obtained. Thereby, the pushing force for pressing the recording/reproducing heads 4 onto the magnetic disk 1 can be made uniform more exactly.

(Fourth Embodiment)

Figure 8:
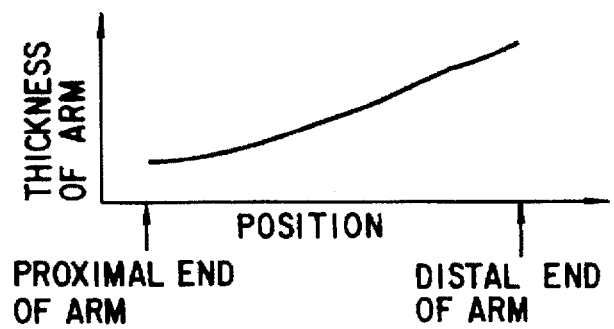
FIG. 8 shows a distribution of the thickness of an arm of a magnetic disk apparatus according to a fourth embodiment of the invention.

In a fourth embodiment of the invention, the thickness of the arm 3 is decreased on the proximal side thereof and increased on the distal side in the longitudinal direction, as shown in FIG. 8. The width of the arm 3 is constant in the longitudinal direction. In this embodiment, the distribution of thickness of the arm 3 is determined such that the pushing force for pressing the recording/reproducing heads 4 mounted on the arm 3 with uniform thickness upon the magnetic disk 1 is first measured and then the thickness of the arm 3 at the positions of the respective heads 4 is so set as to compensate the variation of the pushing force. The pushing force for pressing the heads 4 on the magnetic disk 1 can be made uniform by determining the elastic constant distribution on the basis of the thickness distribution of the arm 3.

In a modification of this embodiment, a weight may be provided on the arm 3 so as to correct the pushing force distribution, thereby varying the elastic constant of the arm 3. For example, the weight may be fixed on the arm 3 by means of an adhesive, etc. Alternatively, a thin film of the same material or a different material may be formed on the arm 3 by a thin film forming process such as sputtering or deposition.

It is also effective to notch the arm 3, thereby varying the elastic constant. The local elastic constant of the arm 3 can be controlled on the basis of the depth, width, shape or density of the notch. According to this method, the elastic constant can be controlled more finely.

Furthermore, another effective method is to change the local mechanical characteristics of the arm 3 by an ion implantation process. Thereby, the elastic constant can be controlled more finely.

(Fifth Embodiment)

Figure 9:
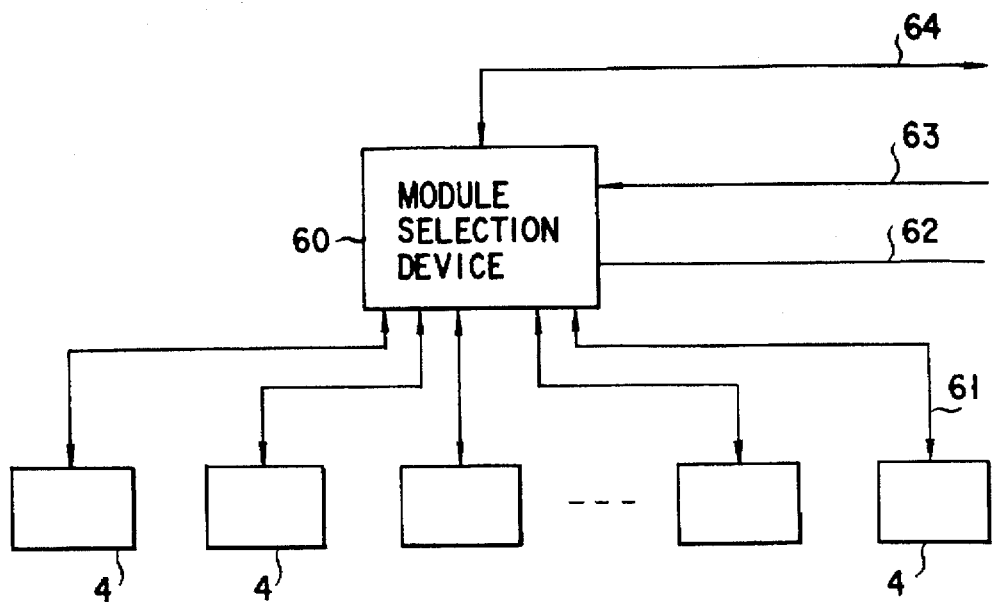
FIG. 9 is a block diagram showing the structure of a main part of a magnetic disk apparatus according to a fifth embodiment of the invention.

FIG. 9 shows the structure of a main part of a fifth embodiment of the invention. In this embodiment, a head selection device 60 is provided to select one of recording/reproducing heads 4. The head selection device 60 is connected to input/output signal lines 61 for signal input/output with the recording/reproducing heads 4, a power supply line 62, a head selection control line 63 for head selection control from the outside, and an input/output signal line 64 for signal input/output with the outside. The input/output signal line 64 is connected to the recording terminal 6 and reproducing terminal 7 on the arm 3 (shown in FIG. 1). All recording/reproducing heads 4 are in the state in which the heads 4 can perform recording/reproducing operations. An external control signal is supplied to the head selection device 60 via the head selection control line 63, and one of the recording/reproducing heads 4 is selected. The selected head 4 alone performs a recording/reproducing operation.

Figure 10A:
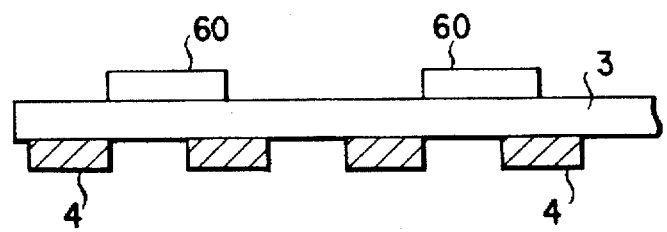
FIGS. 10A and 10B are a side view and a plan view of an element selection device shown in FIG. 9 in the state in which the element selection device is actually mounted.
Figure 10B:
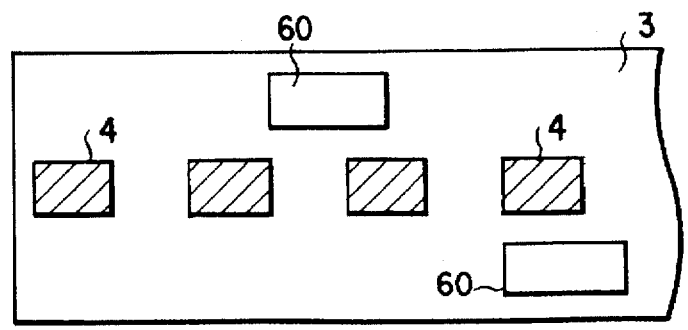

The head selection device 60 comprises an IC. In FIGS. 10A and 10B, a plurality of head selection devices 60 are provided on the arm 3. In FIG. 10A, the head selection devices 60 are disposed on that surface of the arm 3, which is opposed to the surface provided with the recording/reproducing heads 4. In FIG. 10B, the head selection devices 60 are disposed on the same surface as is provided with the recording/reproducing heads 4, such that the head selection devices are located on both sides of the heads 4. In these cases, each head selection device 60 is assigned to a predetermined number of recording/reproducing heads 4.

Suppose that the number of head selection devices 60 is n, the number of recording/reproducing heads is m, and each head selection device 60 selects the recording element 22 and reproducing element 24 of the recording/reproducing head 4. Suppose, furthermore, that the recording/reproducing head 4 is a three-terminal complex head wherein the recording element 22 of the head 4 comprises an induction head, the reproducing element 24 comprises an MR head, one terminal of the induction head is connected to a recording current input terminal, one terminal of the MR head is connected to a sense current input/output terminal, and the other terminals of the induction head and MR head are connected to a common line. In this case, the minimum number of lines led out from each recording/reproducing head 4 is three, i.e. one recording current line, one sense current input/output line and one common line. The common line is connected to all recording/reproducing heads 4. Accordingly, if the head selection device 60 is not provided, the number of lines provided on the arm 3 is 2m+1. If the number m of recording/reproducing heads 4 increases, it is technically difficult to provide all lines on the arm 3.

By contrast, in the present embodiment, the head selection devices 60 are used, and the minimum necessary lines to be connected to each head selection device 60 are one recording current line, one sense current input/output line, one common line, and one head selection control line 61. Thus, the number of lines to be provided on the arm 3 is 3n+1. If m=100 and n=10, the number of lines to be provided on the arm 3 can be remarkably reduced from 201 to 31 by using the head selection devices 60. Therefore, the use of the head selection devices 60 can reduce the number of lines, which increases in accordance with the increase in number of recording/reproducing heads 4.

Besides, since the head selection devices 60 are disposed on the arm 3, the length of lines between the head selection devices 60 and recording/reproducing heads 4 is short and the degradation in recording/reproducing characteristics due to wiring resistance and floating capacitance can be reduced to a minimum. A preamplifier for amplifying reproduction signals may be provided between the head selection device 60 and the recording/reproducing head 4 or between the head selection device 60 and the external structure. If different head selection devices 60 are used for a recording operation and a reproducing operation, the control for the recording and reproducing operations is simplified. Therefore, the design and manufacture of the control system are facilitated, the recording operation and the reproducing operation can be performed independently, and the recording and reproducing operations can be performed in parallel.

(Sixth Embodiment)

FIG. 11 is a block diagram showing the structure of a main part of a sixth embodiment of the invention. Signals from the reproducing elements 24 of the plural recording/reproducing heads 4 are input to a change-over switch circuit 70 directly or via the head selection devices 60 described in the fifth embodiment. The change-over switch circuit 70 supplies a reproduced signal from one of the reproducing elements 24 of the recording/reproducing heads 4 to the reproducing circuit 9 via an output line 71 and supplies a reproduced signal from another of the reproducing elements 24 to the position signal generating circuit 10 via an output line 72.

According to this embodiment, while data is being reproduced by one of the recording/reproducing heads 4, a tracking operation can be performed on the basis of a position signal generated on the basis of servo information in the reproduced signal from another head 4. Thus, head position control (tracking) can be effected with higher precision than the prior art in which a reproducing operation and a tracking operation are performed in a temporally separate manner. If a tracking control and a seek control are performed on the basis of signals from the plural recording/reproducing heads 4, the controls can be performed with higher precision at higher speed than in the prior art in which a tracking operation and a seek operation are performed on the basis of a signal from one head.

The change-over switch 70 needs to comprise the same number of switching elements as the number of output lines.

However, a plurality of output lines may be switched at the same time. In this case, the circuit construction is simplified and the operation speed is increased. Furthermore, signals from the plural recording/reproducing heads 4 may be input to the position signal generating circuit 10 directly or via the head selection devices 60. In this case, the tracking and seek controls can be performed with higher precision at higher speed on the basis of the signals from the plural recording/ reproducing heads 4, than in the prior art in which a tracking operation and a seek operation are performed on the basis of a signal from one head.

(Seventh Embodiment)

In this embodiment, recording/reproducing heads 4 are divided into groups each consisting of a predetermined number of heads 4. A position signal is obtained from each group and used for tracking control, etc. Thus, an optimal tracking control, etc. is performed for each group. If the number of recording/reproducing heads 4 increases, the arrangement pitch of the heads 4 may be varied due to thermal expansion or time-basis variations. However, if the adjacent recording/reproducing heads 4 are grouped, the variation in arrangement pitch of the heads, which influences the tracking or seek, can be reduced.

This embodiment is applicable to the prior art in which both of a data recording region and a servo information recording region are provided on each track on the magnetic disk 1. In this case, servo information can be obtained simultaneously from the plural recording/reproducing heads 4. Using a plurality of position signals generated on the basis of the obtained information, the tracking and seek can be effected with higher precision at higher speed than in the prior art.

(Eighth Embodiment)

FIG. 12 is a plan view showing an example of a recording pattern on the magnetic disk 1, each track on which includes a data recording region as a second track region and a servo information recording region as a first track region. In FIG. 12, numeral 80 denotes adjacent tracks which are accessed by different recording/reproducing heads 4. Servo information recording regions 81 are intermittently provided on the tracks 80 and data recording regions 82 are provided on the other parts of the tracks 80. The servo information recording regions 81 are successively displaced among the tracks 80 by the length of each region 81 so that the regions 81 are made continuous on the adjacent tracks 80.

Thereby, the plural recording/reproducing heads 4 for simultaneously reproducing information from different tracks 80 can always read servo information from any of the tracks 80. As a result, the servo information is continuously read with no temporal interruption. Accordingly, the head position control can be performed with much higher precision than in the prior art in which servo information is read only intermittently since information is always reproduced form a single track 80 alone.

In FIG. 12, servo information on the tracks 80 is not reproduced in an temporally overlapping manner. It is possible, however, to form the servo information recording regions 81 so that servo information on the adjacent tracks 80 can be read in a temporally overlapping manner. Thereby, an influence of noise is eliminated in the change-over switching operation of the switch circuit 70 shown in FIG. 11, and the head position control with higher precision can be performed. Inversely, it is possible to form the servo information recording regions 81 so that no servo information is temporarily read from any of the tracks 80. In this case, the length of each servo information recording region 81 can be decreased and the data recording regions 81 can be enlarged for that much, thereby contributing to enhancement of recording efficiency.

The recording pattern shown in FIG. 12 may be applied to set the positions of the servo information recording regions 81 so that one rotation of the magnetic disk 1 can be controlled only by closed servo information from a plurality of tracks 80. Thereby, the advantage of the grouping described in the seventh embodiment is effectively attained. FIG. 13 shows an example in which the positions of the servo information recording regions 81 are set so that one rotation of the magnetic disk 1 can be controlled only by closed servo information from four tracks.

(Ninth Embodiment)

Figure 14:
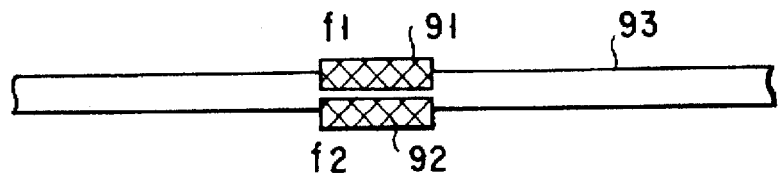
FIG. 14 is a plan view showing a recording pattern on a magnetic disk according to a ninth embodiment of the invention.

FIG. 14 is a plan view showing a ninth embodiment of the invention wherein each of a pair of servo information recording regions 91 and 92 is displaced with respect to a data track 93 by a width of a half-track (in the radial direction of the magnetic disk 1). The frequencies f1 and f2 of servo information recorded on the servo information recording regions 91 and 92 are different from each other. When the recording/reproducing head 4 has passed over the data track 93, the reproduction levels (signal intensities) of servo information with frequencies f1 and f2 are equalized, thereby effecting tracking control. Thus, the tracking control can be effected with higher precision than in the prior art in which only one frequency is used as servo information.

The technique of FIG. 14 is applicable to the method of the eighth embodiment wherein the positions of the servo information recording regions 81 are set so that one rotation of the magnetic disk 1 can be controlled only by closed servo information from a plurality of tracks 80. In this case, servo information with different frequencies may be recorded on the tracks 80 from which information is to be reproduced by the recording/reproducing heads 4. Alternatively, inner peripheral side servo information and outer peripheral side servo information may have different frequencies on all the tracks 80. In the former case, higher-precision control is achieved. In the latter case, the construction of the control circuit is simplified.

(Tenth Embodiment)

Figure 15A:
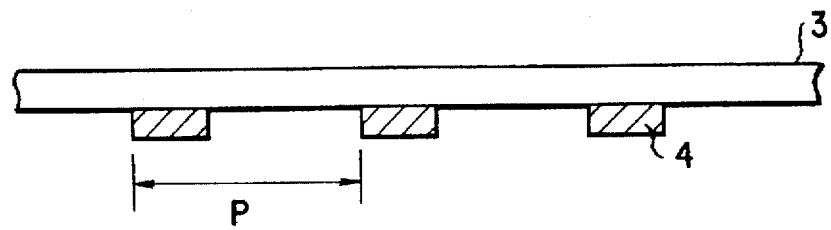
FIGS. 15A and 15B are a side view and a plan view showing a positional relationship between recording/reproducing elements arranged on an arm and recording tracks on a magnetic disk according to a tenth embodiment of the invention.
Figure 15B:
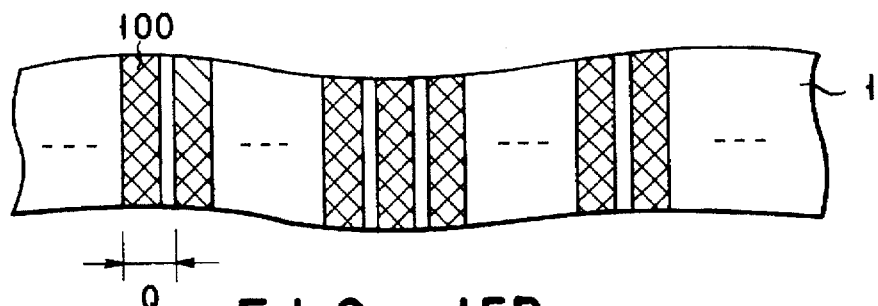

FIGS. 15A and 15B show a tenth embodiment of the invention wherein an arrangement pitch P of recording/ reproducing heads 4 is set at an odd-number of times of ½ of a track pitch Q on the magnetic disk 1. FIG. 15A shows an arrangement of the recording/reproducing heads 4 on the arm 3, and FIG. 15B shows an associated arrangement of tracks on the magnetic disk 1. In the on-track state in which one of the heads 4 is positioned on one of the tracks 100, both adjacent heads 4 are displaced by a half track from the tracks 100. Servo information with different frequencies (f1, f2) is recorded on the adjacent tracks 100.

The ninth embodiment is applied to this embodiment. The arm 3 is controlled so that reproduced signal levels of servo information with two frequencies f1 and f2, which are obtained by two adjacent recording/reproducing heads 4, are equalized. Thereby, the positions of the heads 4 are controlled. According to this method, the head position control with high precision described in the ninth embodiment can be performed without displacing the servo information by the half track at the time of recording. The same control with high precision as in the eighth embodiment shown in FIGS. 12 and 13 can be achieved if the positions of the servo information recording regions 91 and 92 are set so that the reproducing timing of the servo information by the adjacent recording/reproducing heads 4 are temporally displaced.

0(Eleventh Embodiment)

Figure 16:
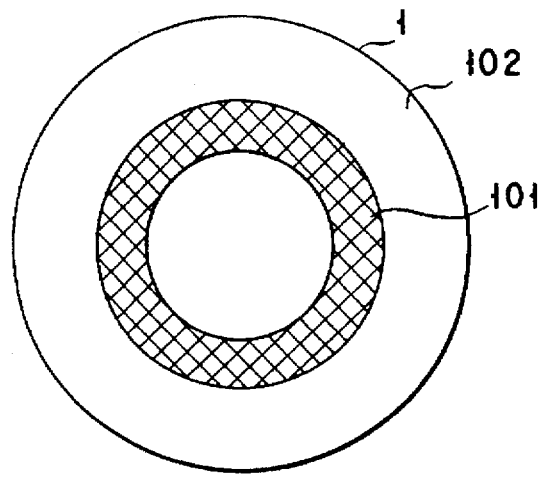
FIG. 16 is a plan view showing a recording pattern on a magnetic disk according to an eleventh embodiment of the invention.

FIG. 16 shows a recording pattern on the magnetic disk 1 according to an eleventh embodiment of the invention. A servo information recording region 101 is set as a first track region on a specified radial position on the magnetic disk 1, e.g. a central position in this embodiment. A data recording region 102 is set as a second track region on another radial position.

If the magnetic disk 1 having the recording pattern in which the servo information and data are recorded on different track regions is used, specific one or more recording/reproducing heads 4 can continuously reproduce the servo information alone. Thus, the servo information can be read continuously at the time of recording/reproducing, and high-precision head position control can be performed without temporal interruption. Furthermore, the data recording region 102 is enlarged. Moreover, in this embodiment, the change-over switch 70 described in the sixth embodiment can be dispensed with. The circuit construction is simplified, and the control and signal processing are performed at higher speed.

In this embodiment, the number of tracks on the servo information recording region 101, i.e. the number of recording/reproducing heads 4 for reproducing servo information alone, may be one or more. If this number is two or more, the head position control can be performed with higher precision. This embodiment may be combined with the seventh to tenth embodiments.

Figure 17A:
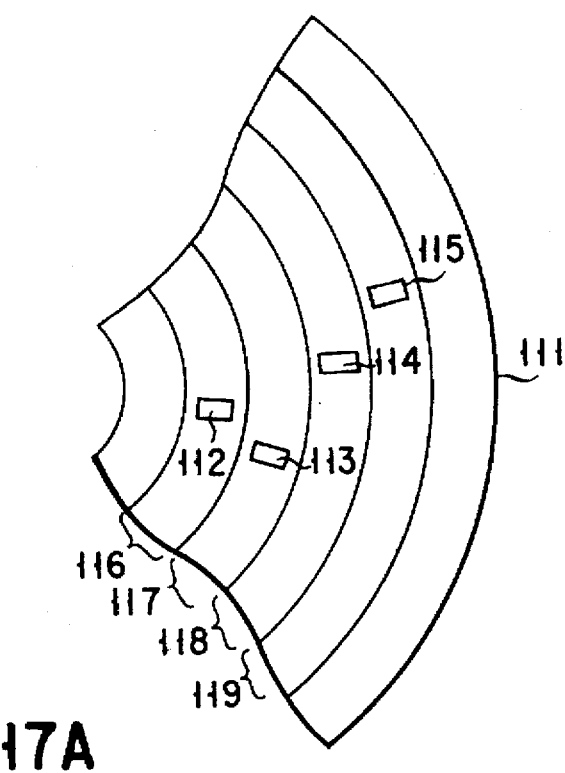
FIGS. 17A and 17B show arrangements of heads on magnetic disks.

Another embodiment of the present invention will now be described. FIG. 17A shows the positions of independently controlled recording/reproducing heads 112, 113, 114 and 115 at predetermined time points on a recording/reproducing surface of a magnetic recording medium 111 within a magnetic recording/reproducing apparatus. The heads 112, 113 and 114 are used for recording/reproducing information, and the head 115 is used for recording/reproducing parity information of the heads 112, 113 and 114. Tracks 116, 117, 118 and 119 are recording regions assigned to the recording/reproducing heads 112, 113, 114 and 115.

Figure 18:
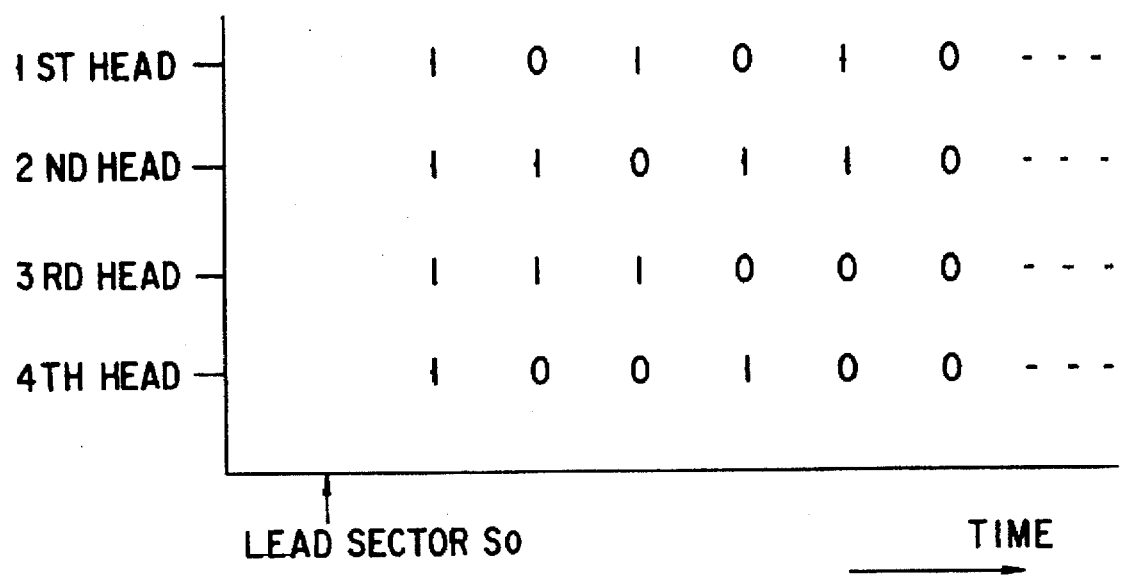
FIG. 18 shows one mode of a parity element.
Figure 19:
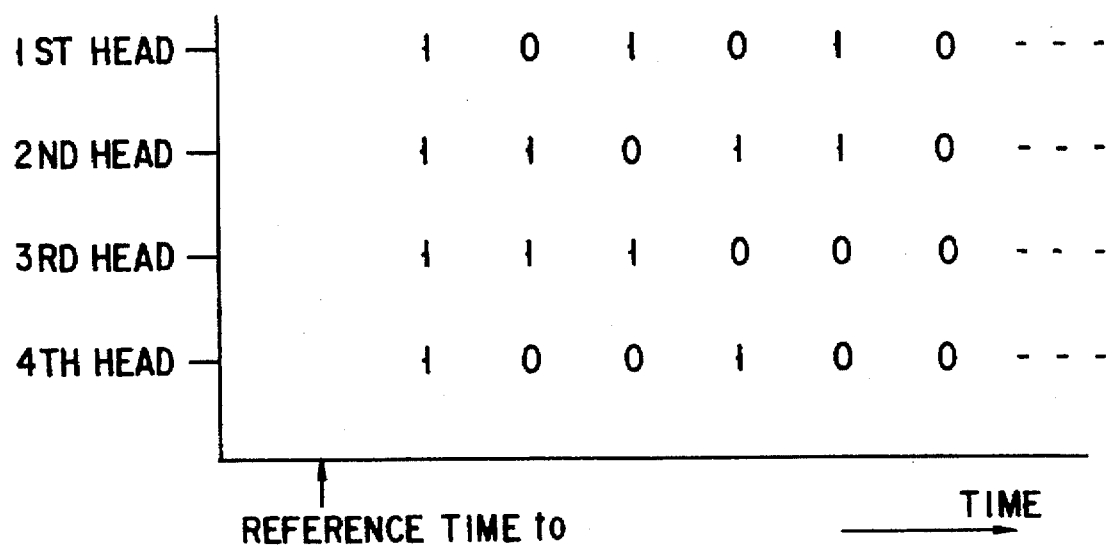
FIG. 19 shows another mode of the parity element.

In the above structure, as shown in FIG. 18, the parity head 115 recorded parity data from the beginning portions of the recording regions of the respective heads so that the total data value at each time point is an even number. Specifically, when the heads 112, 113 and 114 record data values "101010 ...", "110110 ..." and "111000 ..." from the beginning portions of the associated regions, the head 115 records "100100 ...." Thereby, even if the information associated with the head 112 is lost along the circular recording region 116 of the magnetic recording medium or the head 112 is broken and fails to reproduce the information on the region 116, the lost or unreproduced data can be completely restored by the heads 113, 114 and 115. The reference point for parity data recording may not be at the beginning portion of each recording region. As shown in FIG. 19, a proper clock may be set and a predetermined time point may be set as reference point. In this case, the data restoration is performed easily and quickly.

This structure is applicable to the case where recording surfaces of two or more magnetic recording mediums are provided within the magnetic recording apparatus. For example, if two magnetic recording mediums are used and four recording surfaces are used with the same head construction as shown in FIG. 17A, one of the 16 heads is used as parity head. Thus, even if one of the 16 heads or recording regions is damaged, data can be completely restored. If one parity head is provided on each recording surface, data can be completely restored even if the head or region on each recording surface is damaged. In the former case, the recording region is increased. In the latter case, the same or higher reliability is obtained, as or than in the case where one recording surface is used. One of the two constructions may be chosen, depending on the required design of the apparatus.

Another embodiment of the invention will now be described with reference to FIG. 17B. Sectors 121 and 122 are defined by circumferentially dividing recording regions on the magnetic disk 111.

Figure 20:
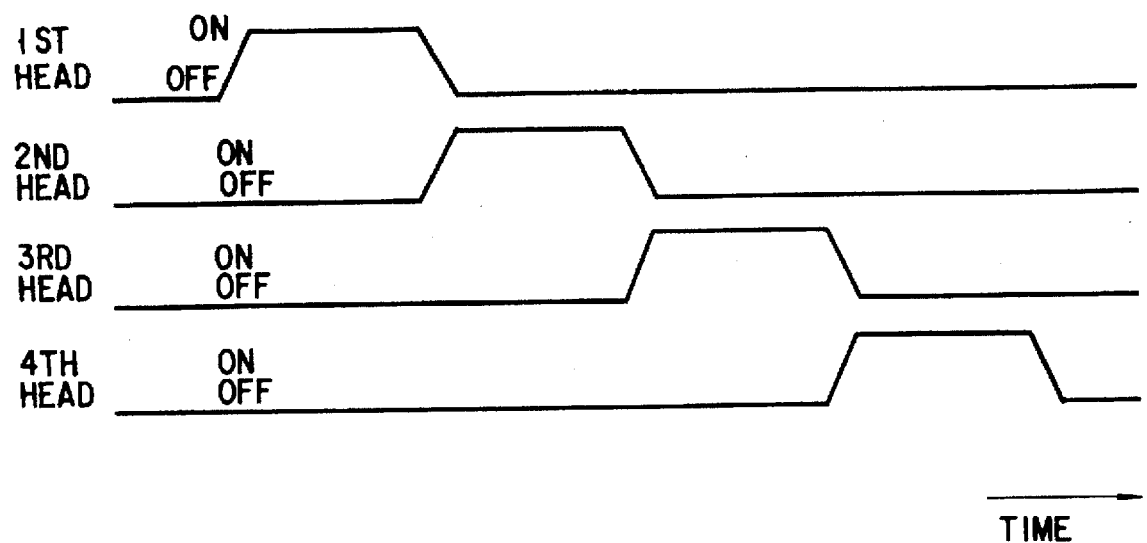
FIG. 20 is a timing chart indicating the selection of the parity element.

Similarly with the preceding example, the parity head 115 recorded parity data from the beginning portions of the respective sectors so that the total data value at each time point is an even number. Thereby, data restoration is carried out at higher speed than in the preceding embodiment. As shown in FIG. 20 by way of example, when a recording operation has been shifted from the sector 121 to sector 122, the head for recording/reproducing parity information is changed from head 115 to head 112 and the heads 113, 114 and 115 are used for recording information. In FIG. 20, each head functions as parity head in a time division manner. In the ON mode, each head functions as parity head. In the OFF mode, each head functions as normal information recording/reproducing head. The parity head must rewrite parity information if any one of the other information recording heads has recorded information. Accordingly, the parity head and the recording region associated therewith are more frequently used for recording/reproducing than the other heads and recording regions. Consequently, the parity head and recording region are considerably degraded. By regularly changing the parity head, as mentioned above, the life of the apparatus can be remarkably elongated.

Figure 17B:
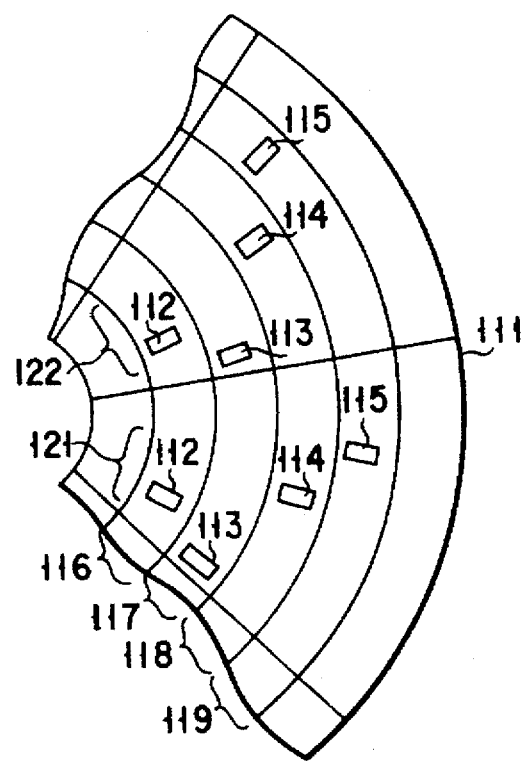

In FIG. 17B, the sector of each recording region is in the same position in the circumferential direction. However, when this invention is worked, the position of the sector is not limited to this example. In order to stabilize the signal quality and make easier the manufacture of the recording medium, the recording density on the medium may be made uniform.

The medium is so formatted that the number of tracks on each region may be equal. As a result, each parity information unit is recorded on coordinates determined by the sector and the number of tracks. Thus, the parity information recording and data restoration can be performed at higher speed. The format in which the number of tracks is equal on each region is applicable to the preceding examples.

The system is constructed so that each head may simultaneously record/reproduce information from the beginning point of each sector. Thereby, the parity information is recorded/reproduced at the same time. Thus, the data recording/reproduction/restoration can be effected at higher speed than in the method wherein the parity information is generated on the basis of information of the other heads which is temporarily stored in a memory (RAM), etc. Since there is no need to provide an apparatus for storing the information of the other heads, reading out the information and generating the parity information based on the read-out information, the construction of the apparatus is simplified.

A sample of the magnetic recording apparatus having the structure shown in FIG. 17A was manufactured. The entire apparatus was sealed in a low-pressure chamber and the amount of levitation of the heads was varied. The value of D50 (a recording frequency at which the intensity of a reproduced signal decreases to half the intensity of a signal at a low frequency) and the retention ratio of recording data were measured. The data retention ratio is a value obtained by subtracting from one the ratio at which data reading is disabled due to damage to the medium or head in 10 to 5 passages. The linear velocity of the medium relative to the head was 10 m/s. The measured results are shown in FIG. 21.

If the levitation amount is reduced to 0.1 µm or less, the recording density is increased exponentially and at the same time the data retention ratio decreases. In particular, in the region of 0.1 µm or less, damages on the medium are circumferentially extending scratches in many cases. Thus, the data restoration measure becomes ineffective in data sequences. In addition, the head itself is damaged in many cases.

In FIG. 21, a broken line indicates a similar experimental result in the case where the data restoration measure was conducted with the parity head similar to that shown in FIG. 17B. It was found that substantially 100% data retention ratio was obtained in the measured range. It was thus proved that high density recording exceeding 100 kfci was performed with reliability.

A similar experiment was conducted with the linear velocity reduced to 0.1 m/s and the head put in contact with the medium. FIG. 22 shows the experimental result. In this case, D50 was 230 kfci. In FIG. 22, a solid line indicates the case where no parity head was provided, and a broken line indicates the case where a parity head was provided. Normally, the data retention ratio is degraded after about 10 times of passages. It was proved, however, that substantially 100% data retention ratio was maintained after 100 or times of passages by the data restoration measure of the present invention.

With a structure similar to that of FIG. 17B, a sample of the apparatus in which heads are arranged at regular intervals in the radial direction of the medium was manufactured. Since the amounts of movement of movement mechanisms of the heads are equal, common parts were used in the movement mechanisms and the design, structure and manufacture were made easier.

The medium was so formatted that the number of tracks on each region may be equal. As a result, each parity information unit on each region is indicated on coordinates determined by the sector and the number of tracks. Thus, the access to the parity information at the time of conducting the restoration measure can be effected by a simple system using data addresses and high-speed processing can be performed.

The heads were linearly arranged in the radial direction of the medium. Thereby, the heads were enabled to record/reproduce data at the same time. The parity information was recorded at the same time when the other heads carried out recording operations. No time was lost for recording the parity information. When information associated with one of the heads cannot be reproduced, there is no need to seek parity information for restoration or information of the other heads. The data at the position of the head can be restored and the total processing time can be reduced.

Figure 23:
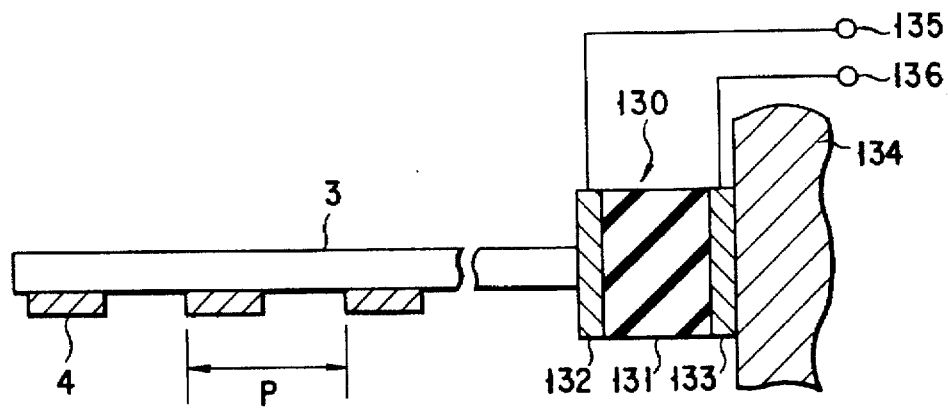
FIG. 23 shows an arrangement of recording/reproducing elements on the arm, other than the arrangement shown in FIG. 3.

FIG. 23 shows another embodiment of the present invention. Numeral 3 denotes an arm, 4 recording/reproducing heads, 131 a piezoelectric body, 132 and 133 electrodes, and 134 an arm support member. Ten recording/reproducing heads 4 were provided in total, and the interval of the heads 4 was set at 100 µm or 90% of the maximum stroke of the piezoelectric body 131. When a voltage is applied to 10 the piezoelectric body 131 via the electrodes 132 and 133, the arm 3 is moved by a degree corresponding to the shift of the piezoelectric body 131, and all heads 4 can move simultaneously by the same amount. The arm 3 was situated in a direction crossing the tracks on a disk-like medium, the recording regions associated with the heads 4 were set, as shown in FIG. 17B, and the medium was formatted with a track pitch of 4 µm. The linear velocity of the medium relative to the heads 4 was set at 0.1 m/s. The heads 4 were provided with the same functions as in the embodiment shown in FIG. 17B so as to carry out the data restoring process.

The time for the access of each head 134 to a desired track was set. An average seek time was reduced ten times, as compared to the case where each head was independently controlled.

Information stored in a memory (RAM) in advance was time-divided into nine information units, and the information units were assigned as recording/reproducing information associated with the heads 134. As in the preceding example, the parity information was generated simultaneously with the recording/reproducing operations of the heads. The processing speed was increase 20 times, as compared to the case where information associated with each head was acquired and analyzed to generate parity information and the parity information was recorded.

With this apparatus, the information on a specified track was successively reproduced until one head or medium was damaged and signal detection was disabled. Then, an attempt was made to restore data from a head capable of reproducing signals. Twenty experiments were conducted and the data restoration ratio was 95% on average.

For the purpose of comparison, each head was made to record/reproduce parity information independently, instead of simultaneously recording/reproducing parity information. Experiments similar to the above ones were conducted to compare time periods for data restoration. Ten experiments were conducted for each head, and it was found that the time for data restoration was decreased 20 times if the parity information was simultaneously recorded/reproduced.

As has been described above, according to the present invention, there is provided a magnetic disk apparatus comprising an arm situated above a disk-like magnetic recording medium in a direction crossing tracks on the magnetic recording medium and arm driving means for moving the arm in the longitudinal direction thereof. A plurality of recording/reproducing modules (heads) for recording/reproducing information on the magnetic recording medium are arranged on the arm at intervals less than the maximum shift distance of the arm moved by the arm driving means. Thereby, the track access can be performed with high precision at high speed. Furthermore, the recording/reproducing operations can be performed at high speed.

Besides, according to the present invention, there is provided a magnetic recording apparatus wherein a plurality of recording/reproducing heads assigned to different recording regions are used, and a magnetic recording medium on which one head records parity information for the other heads is used, thereby enhancing the reliability of the apparatus against data loss due to damage to the medium/head.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic recording/reproducing apparatus comprising:

a disk-like magnetic recording medium provided with tracks for recording/reproducing information;

an arm associated with the disk-like magnetic recording medium along a radial direction of the disk-like magnetic recording medium so as to cross said tracks;

an arm driver for linearly driving the arm in a longitudinal direction of the arm;

a plurality of recording/reproducing elements for recording/reproducing information on said tracks, said recording/reproducing elements being arranged on the arm along the longitudinal direction of the arm at an interval less than a maximum movement amount of the arm moved by the arm driver; and an arm support member, provided outside of the disk-like magnetic recording medium, for supporting a proximal end portion of said arm such that a distance between a distal end portion of the arm and the disk-like magnetic recording medium is less than a distance between the proximal end portion of the arm and the disk-like magnetic recording medium.

2. The magnetic recording/reproducing apparatus according to claim 1, wherein said arm driver is coupled to said arm and includes a piezoelectric element for moving the arm in the longitudinal direction of the arm.

3. The magnetic recording/reproducing apparatus according to claim 1, wherein said magnetic recording medium includes a first track on which position signal generation information for generating a position signal representing a relative position of the track on the magnetic recording medium with respect to the recording/reproducing element is recorded, and a second track on which information different from the position signal generation information is recorded.

4. The magnetic recording/reproducing apparatus according to claim 1, wherein said recording/reproducing elements are supported on the arm with elastic bodies interposed.

5. The magnetic recording/reproducing apparatus according to claim 1, wherein said arm has such characteristics that an elastic constant of the arm varies in the longitudinal direction of the arm.

6. The magnetic recording/reproducing apparatus according to claim 1, further comprising an element selector, situated on said arm, for selecting one of said recording/reproducing element so as to record/reproduce information.

7. A magnetic re-cording/reproducing apparatus comprising:

a magnetic recording medium provided with tracks for recording/reproducing information;

an arm associated with the magnetic recording medium so as to cross said tracks;

an arm driver for lineally driving the arm in a longitudinal direction of the arm; and a plurality of recording/reproducing elements for recording/reproducing information on said tracks, said recording/reproducing elements being arranged on the arm along the longitudinal direction of the arm;

wherein a proximal end portion of the arm is supported such that a distance between a distal end portion of the arm and the magnetic recording medium is less than a distance between the proximal end portion of the arm and the magnetic recording medium, so as to allow a uniform pushing force for pressing each recording/reproducing element of the plurality of recording/reproducing elements onto the magnetic recording medium at a time of the recording/reproducing of the information.

8. The magnetic recording/reproducing apparatus according to claim 7, wherein said arm driver is coupled to said arm and includes a piezoelectric element for moving the arm in the longitudinal direction of the arm.

9. The magnetic recording/reproducing apparatus according to claim 7, further comprising an arm support member, provided at outside of the magnetic recording medium, for supporting a proximal end portion of said arm such that a distance between a distal end portion of the arm and the magnetic recording medium is less than a distance between the proximal end portion of the arm and the magnetic recording medium.

10. The magnetic recording/reproducing apparatus according to 7, wherein said recording/reproducing elements are supported on the arm with interposed elastic bodies.

11. The magnetic recording/reproducing apparatus according to claim 7, wherein said arm has such characteristics that an elastic constant of the arm varies in the longitudinal direction of the arm.

12. The magnetic recording/reproducing apparatus according to claim 7, further comprising an element selector, situated on said arm, for selecting one of said plurality of recording/reproducing elements so as to record/reproduce information on said selected one of said plurality of recording/reproducing elements.

13. The magnetic recording/reproducing apparatus according to 7, wherein said magnetic recording medium includes a first track on which position signal generation information for generating a position signal representing a relative position of the track on the magnetic recording medium with respect to a recording/reproducing element of said plurality of recording/reproducing elements which is recording, and a second track on which information different from the position signal generation information is recorded.

* * * * *